United States Patent
Maeda et al.

(10) Patent No.: US 8,783,390 B2
(45) Date of Patent: Jul. 22, 2014

(54) VEHICLE DRIVE APPARATUS

(75) Inventors: Yoshinori Maeda, Aichi-gun (JP);
Akihiro Hosokawa, Susono (JP);
Yousuke Suzuki, Susono (JP);
Michitaka Tsuchida, Susono (JP);
Kazuya Okumura, Mishima (JP);
Tadahiro Oshiumi, Gotenba (JP);
Kensuke Yoshizue, Susono (JP); Koji Sugiyama, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 909 days.

(21) Appl. No.: 12/295,336

(22) PCT Filed: Jun. 21, 2007

(86) PCT No.: PCT/IB2007/002303
§ 371 (c)(1),
(2), (4) Date: Sep. 30, 2008

(87) PCT Pub. No.: WO2007/148225
PCT Pub. Date: Dec. 27, 2007

(65) Prior Publication Data
US 2009/0108671 A1    Apr. 30, 2009

(30) Foreign Application Priority Data
Jun. 22, 2006    (JP) .................................. 2006-173156

(51) Int. Cl.
*B60K 17/356* (2006.01)
(52) U.S. Cl.
CPC .................................. *B60K 17/356* (2013.01)
USPC ................. 180/6.2; 180/6.5; 180/242; 701/69

(58) Field of Classification Search
USPC .......... 180/197, 6.2, 6.48, 6.5, 402, 422, 446, 180/242; 701/69, 73
See application file for complete search history.

(56) References Cited

U.S. PATENT DOCUMENTS 5,163,530 A * 11/1992 Nakamura et al. ............. 180/197
6,862,512 B2 * 3/2005 Arndt et al. ..................... 701/70

(Continued)

FOREIGN PATENT DOCUMENTS

DE    199 18 597 A1    11/2000
DE    100 61 966 A1    6/2002

(Continued)

OTHER PUBLICATIONS

Slavnich, D., "Honda Talks the Torque", Automotive Engineer, Professional Engineering Publishing, London, GB, vol. 29, No. 5, p. 60, XP001195483, (2004).

(Continued)

*Primary Examiner* — Anne Marie Boehler
(74) *Attorney, Agent, or Firm* — Oblon, Spivak, McClelland, Maier & Neustadt, L.L.P.

(57) ABSTRACT

A vehicle drive apparatus independently controls drive forces for a front-right drive wheel, a front-left drive wheel, a rear-right drive wheel, and a rear-left drive wheel using a front-right electric motor, a front-left electric motor, a rear-right electric motor, and a rear-left electric motor, respectively. The drive forces for the drive wheels of a vehicle incorporating the vehicle drive apparatus are determined based on the target moments in the yaw and roll directions of the vehicle, the total drive for the drive wheels, and the drive reaction forces at the drive wheels. Thus, the performance desired by the driver can be achieved, and the drivability therefore improves accordingly.

21 Claims, 10 Drawing Sheets

(56) References Cited

U.S. PATENT DOCUMENTS

| | | |
|---|---|---|
| 7,386,379 B2 * | 6/2008 | Naik et al. .................... 701/41 |
| 7,418,327 B2 * | 8/2008 | Pelchen et al. ................ 701/41 |
| 2003/0144784 A1 * | 7/2003 | Tashiro et al. ................ 701/54 |
| 2004/0163856 A1 * | 8/2004 | Kroppe ......................... 180/6.2 |

FOREIGN PATENT DOCUMENTS

| | | |
|---|---|---|
| DE | 103 03 461 A1 | 9/2003 |
| EP | 0 645 265 A1 | 3/1995 |
| EP | 1 775 188 | 4/2007 |
| FR | 2 840 577 | 12/2003 |
| JP | 6 211064 | 8/1994 |
| JP | 2004 58960 | 2/2004 |
| JP | 2005 225373 | 8/2005 |
| JP | 2005 306152 | 11/2005 |
| JP | 2005 312190 | 11/2005 |
| JP | 2006 131023 | 5/2006 |
| JP | 2006 217710 | 8/2006 |
| WO | 2006 013922 | 2/2006 |

OTHER PUBLICATIONS

Korean Office Action issued on Feb. 23, 2011 in corresponding Korean Application No. 10-2008-7030908 (with an English Translation).

* cited by examiner

FIG.9

| θ'\θ | θ'₅ | θ'₄ | θ'₃ | θ'₂ | θ'₁ | θ'₀ |
|---|---|---|---|---|---|---|
| θ₀ | Y₁ | Y₁ | Y₂ | Y₃ | Y₄ | Y₄ |
| θ₁ | Y₁ | Y₁ | Y₂ | Y₃ | Y₄ | Y₄ |
| θ₂ | Y₂ | Y₂ | Y₂ | Y₃ | Y₄ | Y₄ |
| θ₃ | Y₃ | Y₃ | Y₃ | Y₃ | Y₄ | Y₄ |
| θ₄ | Y₄ | Y₄ | Y₄ | Y₄ | Y₄ | Y₄ |
| θ₅ | Y₄ | Y₄ | Y₄ | Y₄ | Y₄ | Y₄ |

70

$Y_1(=0) < Y_2 < Y_3 < Y_4(=1)$

VEHICLE DRIVE APPARATUS

INCORPORATION BY REFERENCE

The disclosure of Japanese Patent Application No. 2006-173156 filed on Jun. 22, 2006, including the specification, drawings and abstract is incorporated herein by reference in its entirety.

BACKGROUND OF THE INVENTION

1. Field of the Invention

The invention relates to a vehicle drive apparatus that can provide different drive forces at at least a pair of left and right wheels.

2. Description of the Related Art

When a vehicle, such as a passenger vehicle and a truck, is turning at a curve, the vehicle rolls due to inertial force acting toward the outer side of the curve. Japanese Patent Application Publication JP-A-2005-306152 describes a drive apparatus that independently drives four wheels of a vehicle and suppresses the rolling of the vehicle by controlling the drive force for each drive wheel.

However, since the control performed by the drive apparatus described in this publication only suppresses the rolling of the vehicle, the yaw moment of the vehicle may become less than the level needed for the vehicle to turn appropriately or may exceed that level, and this will deteriorate the drivability of the vehicle. That is, in this case, the performance desired by the driver can not be achieved sufficiently.

SUMMARY OF THE INVENTION

In view of the above, the invention has been made to provide a vehicle drive apparatus that achieves the performance desired by the driver and thereby improves the drivability of the vehicle.

A first aspect of the invention relates to a vehicle drive apparatus for a vehicle that can provide different drive forces at at least a pair of left and right drive wheels, respectively. This vehicle drive apparatus drives the left and right drive wheels by drive forces that are determined based on the total drive force for the drive wheels, the drive reaction forces at the drive wheels, and at least two of the target moment required in the yaw direction of the vehicle, the target moment required in the roll direction of the vehicle, and the target moment required in the pitch direction of the vehicle.

As mentioned above, this vehicle drive apparatus determines the drive forces that for the left and right drive wheels based on the total drive force for the drive wheels, the drive reaction forces at the drive wheels, and at least two of the target moment required in the yaw direction of the vehicle, the target moment required in the roll direction of the vehicle, and the target moment required in the pitch direction of the vehicle. Then, the vehicle drive apparatus controls the drive forces at the respective drive wheels so as to achieve at least two of the target yaw moment, the target roll moment, and the target pitch moment. Thus, the vehicle drive apparatus according to the first aspect of the invention achieves the performance desired by the driver and thereby improves the drivability of the vehicle.

The vehicle drive apparatus described above may be such that the drive forces for the left and right drive wheels are determined based on at least two of the relation between the target moment in the yaw direction of the vehicle and the difference between the drive force for the left drive wheel and the drive force for the right drive wheel, the relation between the target moment in the roll direction of the vehicle and the difference between the drive reaction force at the left drive wheel and the drive reaction force at the right drive wheel, and the relation between the target moment in the pitch direction of the vehicle and the drive reaction forces at the left and right drive wheels.

The vehicle drive apparatus described above may be such that the drive forces for the left and right drive wheels are determined using the target moment in the yaw direction of the vehicle, the target moment in the roll direction of the vehicle, and the target moment in the pitch direction of the vehicle.

The vehicle drive apparatus described above may be such that the drive forces for the left and right drive wheels are determined using the target moment in the yaw direction of the vehicle and the target moment in the roll direction of the vehicle.

The vehicle drive apparatus described above may be such that when it is impossible to achieve the target moment in the yaw direction of the vehicle, the target moment in the roll direction of the vehicle, and the target moment in the pitch direction of the vehicle at the same time, at least one of the target moment in the yaw direction of the vehicle and the target moment in the roll direction of the vehicle is achieved.

The vehicle drive apparatus described above may be such that when it is impossible to achieve the target moment in the yaw direction of the vehicle and the target moment in the roll direction of the vehicle at the same time, if the yaw moment of the vehicle that is estimated to arise in response to the left and right drive wheels producing the drive forces for controlling rolling of the vehicle is above a limit yaw moment of the vehicle, the target moment in the yaw direction of the vehicle is achieved.

The vehicle drive apparatus described above may be such that when it is impossible to achieve the target moment in the yaw direction of the vehicle and the target moment in the roll direction of the vehicle at the same time, the target moment in the roll direction of the vehicle is achieved.

The vehicle drive apparatus described above may be such that when it is impossible to achieve the target moment in the yaw direction of the vehicle and the target moment in the roll direction of the vehicle at the same time, the target moment in the yaw direction of the vehicle is achieved.

The vehicle drive apparatus described above may be such that whether to achieve the target moment in the yaw direction of the vehicle or the target moment in the roll direction of the vehicle is determined based on the steering angle of a steerable wheel of the vehicle and the velocity of the steering angle.

The vehicle drive apparatus described above may be such that it is determined to achieve the target moment in the roll direction if the steering angle is equal to or smaller than a predetermined threshold and the velocity of the steering angle is not 0.

The vehicle drive apparatus described above may be such that it is determined to achieve the target moment in the yaw direction if the steering angle is larger than the predetermined threshold or if the velocity of the steering angle is 0.

The vehicle drive apparatus described above may be such that electric motors are provided at the drive wheels and produce the drive forces for the drive wheels.

As such, the vehicle drive apparatus according to the invention achieves the performance desired by the driver and thereby improves the drivability of the vehicle.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which:

FIG. 9 is a chart illustrating one example of a weighting factor map describing values of a weighting factor Y.

DETAILED DESCRIPTION OF THE EXEMPLARY EMBODIMENTS

In the following description and the accompanying drawings, the present invention will be described in more detail with reference to exemplary embodiments. In the following exemplary embodiments, the invention is mainly applied to electric motor vehicles. However, applications of the invention are not limited to electric motor vehicles, but may be any vehicles in which different drive forces can be provided at at least a pair of left and right drive wheels, respectively. The drive force for the right drive wheel and the drive force for the left drive wheel may by controlled by controlling each drive force independently or by controlling the distribution ratio of drive force between the left and right drive wheels.

First, a vehicle drive apparatus according to the first exemplary embodiment of the invention will be described. The vehicle drive apparatus is characterized in the following feature. First, the drive forces for the right and left drive wheels are determined based on the total drive force for the drive wheels, the drive reaction forces at the drive wheels, and at least two of the target moment of the vehicle required in the yaw direction of the vehicle (target yaw moment), the target moment of the vehicle required in the roll direction of the vehicle (target roll moment), and the target moment of the vehicle required in the pitch direction of the vehicle (target pitch moment). Then, the drive forces at the respective drive wheels are controlled so as to achieve at least two of the target yaw moment, the target roll moment, and the target pitch moment at the same time. With regard to the selection of at least two among the three target moments, the vehicle dynamics control of the first exemplary embodiment is performed so as to achieve the target yaw moment and the target roll moment at the same time. Note that the vehicle dynamics control may alternatively be performed so as to achieve the target roll moment and the target pitch moment at the same time.

Figure 1:
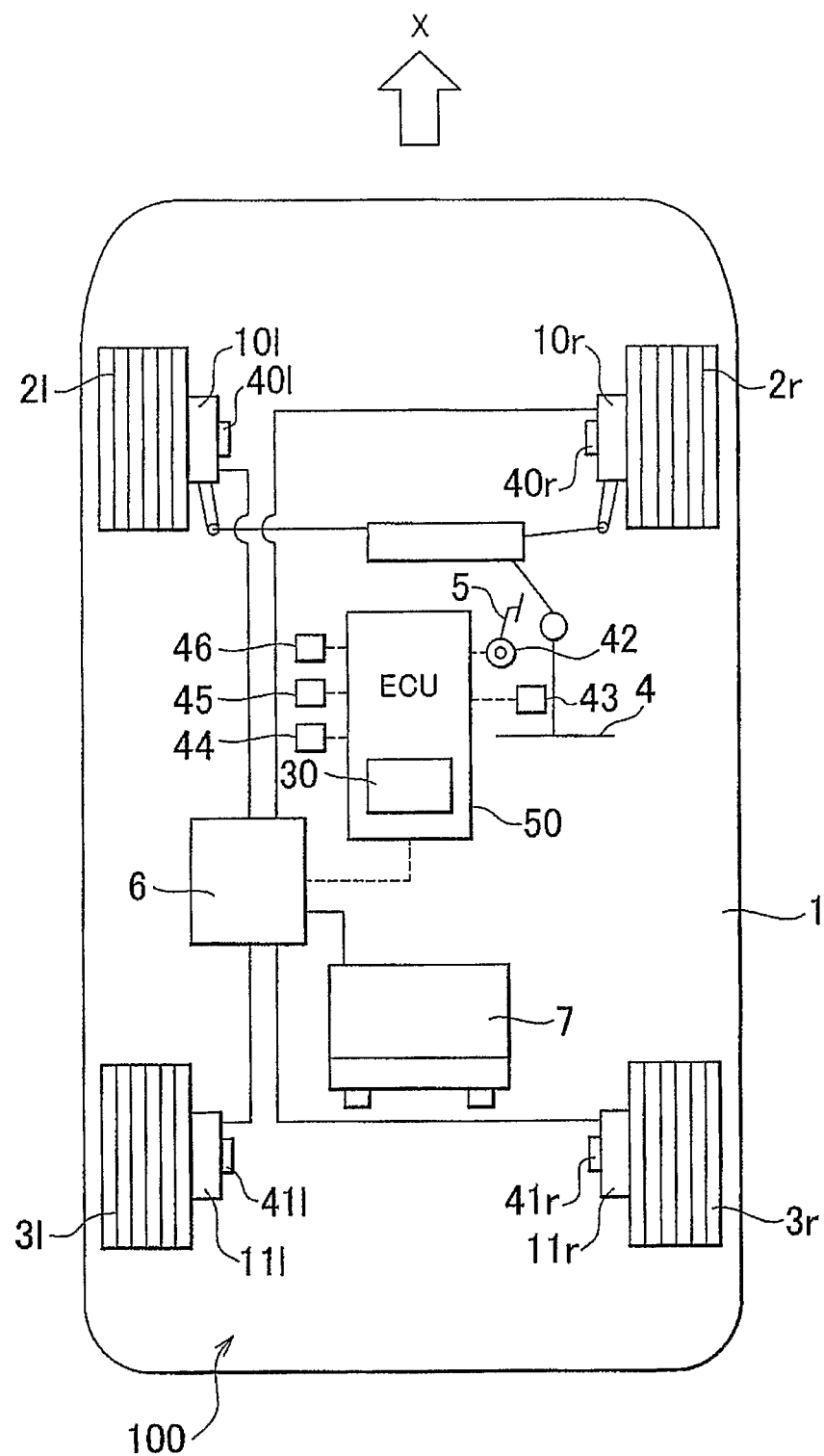
FIG. 1 is a view schematically showing the configuration of a vehicle incorporating the vehicle drive apparatus of the first exemplary embodiment.
Figure 2:
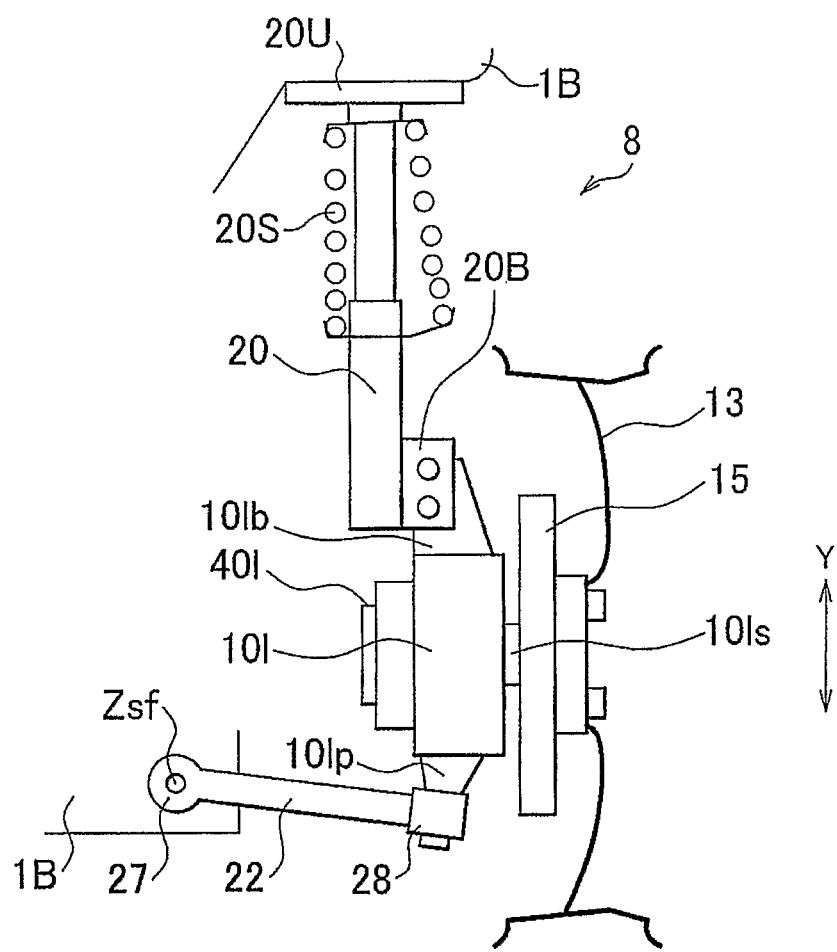
FIG. 2 is an illustrative view showing an exemplary structure of a front-wheel suspension assembly that is involved in the vehicle drive apparatus of the first exemplary embodiment.
Figure 3:
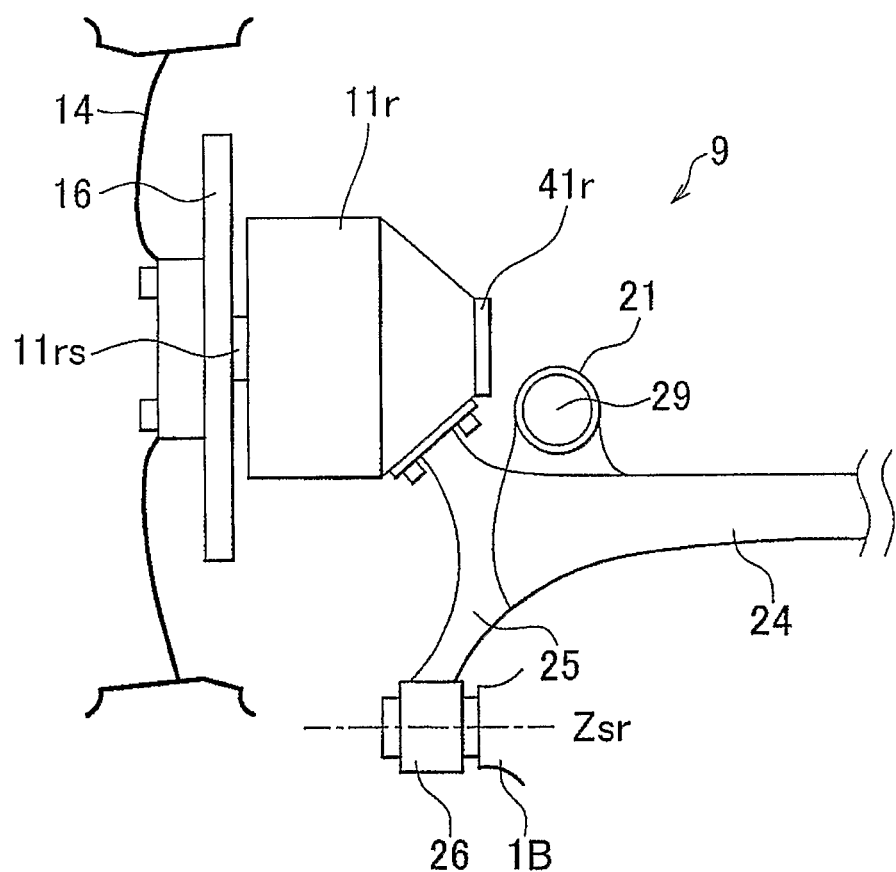
FIG. 3 is an illustrative view showing an exemplary structure of a rear-wheel suspension assembly that is involved in the vehicle drive apparatus of the first exemplary embodiment.

FIG. 1 is a view schematically showing the configuration of a vehicle incorporating the vehicle drive apparatus of the first exemplary embodiment. FIG. 2 is an illustrative view showing an exemplary structure of a front-wheel suspension assembly that is incorporated in the vehicle drive apparatus of the first exemplary embodiment. FIG. 3 is an illustrative view showing an exemplary structure of a rear-wheel suspension assembly that is incorporated in the vehicle drive apparatus of the first exemplary embodiment. The vehicle 1 has the vehicle drive apparatus 100 that only uses electric motors to produce drive force. The vehicle drive apparatus 100 determines the drive forces for a front-left wheel 2*l*, a front-right wheel 2*r*, a rear-left wheel 3*l*, and a rear-right wheel 3*r* based on the reaction forces against the drive forces at the front-left wheel 2*l*, the front-right wheel 2*r*, the rear-left wheel 3*l*, and the rear-right wheel 3*r*, the total drive force for the vehicle 1, and at least two of the target yaw moment, the target roll moment, and the target pitch moment. The vehicle drive apparatus 100 has a front-wheel suspension assembly 8 that is attached to the vehicle 1 and supports the front-left wheel 2*l* and the front-right wheel 2*r* and a rear-wheel suspension assembly 9 that is attached to the vehicle 1 and supports the rear-left wheel 3*l* and the rear-right wheel 3*r*.

In the first exemplary embodiment, a front-left electric motor 10*l* for driving the front-left wheel 2*l*, a front-right electric motor 10*r* for driving the front-right wheel 2*r*, a rear-left electric motor 11*l* for driving the rear-left wheel 3*l*, and a rear-right electric motor 11*r* for driving the rear-right wheel 3*r* are drive force producing devices. The drive force for the front wheels and the drive force for the rear wheels are separately controlled by a vehicle dynamics controller 30 incorporated in an ECU (Electric Control Unit) 50. In the first exemplary embodiment, the vehicle dynamics controller 30 serves as a drive force changing device to change the drive force for each drive wheel of the vehicle 1.

Here, it is to be noted that in this specification "left side" and "right side" are defined with respect to the direction in which the vehicle 1 travels forward (the direction indicated by the arrow X in FIG. 1). More specifically, "left side" and "right side" refer to the left side and the right side as viewed from the vehicle 1 oriented in the forward direction. Likewise, "front" refers to the side to which the vehicle 1 travels forward, and "rear" refers to the side to which the vehicle 1 travels backward, that is, the side opposite the side to which the vehicle 1 travels forward.

In the vehicle drive apparatus 100, the front-left wheel 2*l*, the front-right wheel 2*r*, the rear-left wheel 3*l*, and the rear-right wheel 3*r* are driven by separate electric motors. That is, all the wheels of the vehicle 1 are drive wheels. In other words, the front-left wheel 2*l*, the front-right wheel 2*r*, the rear-left wheel 3*l*, and the rear-right wheel 3*r* are the drive wheels of the vehicle 1. In the vehicle drive apparatus 100, the front-left wheel 2*l*, the front-right wheel 2*r*, the rear-left wheel 3*l*, and the rear-right wheel 3*r* are directly driven by four electric motors; a front-left electric motor 10*l*, a front-right electric motor 10*r*, a rear-left electric motor 11*l*, and a rear-right electric motor 11*r*. The front-left electric motor 10*l*, the front-right electric motor 10*r*, the rear-left electric motor 11*l*, and the rear-right electric motor 11*r* are in-wheel motors and arranged in the wheel bodies of the front-left wheel 2*l*, the front-right wheel 2*r*, the rear-left wheel 3*l*, and the rear-right wheel 3*r*, respectively.

Note that a speed reduction mechanism may be provided between each wheel and each electric motor so that the rotations of the front-left electric motor 10*l*, the front-right electric motor 10*r*, the rear-left electric motor 11*l*, and the rear-right electric motor 11*r* are transmitted at reduced speeds to the front-left wheel 2*l*, the front-right wheel 2*r*, the rear-left wheel 3*l*, and the rear-right wheel 3*r*, respectively. Normally, smaller electric motors provide lower toque. However, because motor torque can be increased using a speed reduction mechanism, the use of speed reduction mechanisms enables small motors to be used as the front-left electric motor 10*l*, the front-right electric motor 10*r*, the rear-left electric motor 11*l*, and the rear-right electric motor 11*r*, respectively.

The ECU 50 controls the front-left electric motor 10*l*, the front-right electric motor 10*r*, the rear-left electric motor 11*l*, and the rear-right electric motor 11*r* so as to adjust the drive forces at the respective drive wheels as needed. In the first exemplary embodiment, the total drive force F of the vehicle drive apparatus 100 and the drive forces at the respective drive wheels 2*l*, 2*r*, 3*l*, and 3*r* are controlled based on the operation amount of an accelerator pedal 5 that is detected by an accelerator operation amount sensor 42.

The rotation angles and the rotation speeds of the front-left electric motor 10*l*, the front-right electric motor 10*r*, the rear-left electric motor 11*l*, and the rear-right electric motor 11*r* are detected by a front-left resolver 40*l*, a front-right resolver 40*r*, a rear-left resolver 41*l*, and a rear-right resolver 41*r*, respectively. The outputs of the front-left resolver 40*l*, the front-right resolver 40*r*, the rear-left resolver 41*l*, and the rear-right resolver 41*r* are provided to the ECU 50 and used in the control of the front-left electric motor 10*l*, the front-right electric motor 10*r*, the rear-left electric motor 11*l*, and the rear-right electric motor 11*r*.

The front-left electric motor 10*l*, the front-right electric motor 10*r*, the rear-left electric motor 11*l*, and the rear-right electric motor 11*r* are connected to an inverter unit 6. The inverter unit 6 is connected to an in-vehicle electric power supply 7 that is constituted by, for example, a nickel-hydrogen battery or a lead-acid battery. Electric power is supplied from the in-vehicle electric power supply 7 via the inverter unit 6 to the front-left electric motor 10*l*, the front-right electric motor 10*r*, the rear-left electric motor 11*l*, and the rear-right electric motor 11*r* as needed. These electric power outputs are controlled by the inverter unit 6 that operates in accordance with the commands output from the ECU 50. In the first exemplary embodiment, one inverter is provided for one electric motor. That is, the inverter unit 6 is constituted of four inverters provided for the front-left electric motor 10*l*, the front-right electric motor 10*r*, the rear-left electric motor 11*l*, and the rear-right electric motor 11*r*, respectively.

When the front-left electric motor 10*l*, the front-right electric motor 10*r*, the rear-left electric motor 11*l*, and the rear-right electric motor 11*r* are operating to produce drive force for propelling the vehicle 1, electric power is supplied from the in-vehicle electric power supply 7 to the respective electric motors 10*l*, 10*r*, 11*l*, and 11*r* via the inverter unit 6. On the other hand, when the vehicle 1 is decelerating, the front-left electric motor 10*l*, the front-right electric motor 10*r*, the rear-left electric motor 11*l*, and the rear-right electric motor 11*r* operate as electric power generators carrying out regeneration of electric power, and the regenerated electric power is stored in the in-vehicle electric power supply 7. When performing the electric power regeneration, the ECU 50 controls the inverter unit 6 based on given signals, such as brake signals and accelerator-off signals.

Referring to FIG. 2, the front-left electric motor 10*l* is attached to the front-wheel suspension assembly 8. That is, the front-left electric motor 10*l* is attached to the vehicle 1 via the front-wheel suspension assembly 8. In other words, the vehicle 1 supports the front-left electric motor 10*l* via the front-wheel suspension assembly 8. Note that the structure for supporting the front-right electric motor 10*r* is the same as that for the front-left electric motor 10*l*. On the other hand, referring to FIG. 3, the rear-right electric motor 11*r* is attached to the rear-wheel suspension assembly 9. That is, the rear-right electric motor 11*r* is attached to the vehicle 1 via the rear-wheel suspension assembly 9. In other words, the vehicle 1 supports the rear-right electric motor 11*r* via the rear-wheel suspension assembly 9. Note that the support structure for the rear-left electric motor 11*l* is the same as that for the rear-right electric motor 11*r*. Next, more details on the structures of the front-wheel suspension assembly 8 and the rear-wheel suspension assembly 9 will be descried with reference to FIG. 2 and FIG. 3.

Referring to FIG. 2, the front-wheel suspension assembly 8 of the first exemplary embodiment has a so-called strut suspension arrangement. An upper mount 20U is provided at one end of a damper 20, and the damper 20 is attached to a vehicle body 1B via the upper mount 20U. An electric motor holding bracket 20B is provided at the other end of the damper 20. The electric motor holding bracket 20B is attached to a motor-side bracket 101*b* that is formed as a portion of the main body of the front-left electric motor 10*l*, whereby the damper 20 and the front-left electric motor 10*l* are fixed to each other. The front-left resolver 40*l* is arranged on a drive shaft (electric motor drive shaft) 101*s* of the front-left electric motor 10*l*. The front-left resolver 40*l* serves as a rotational angle detecting device for detecting the rotation angle of the electric motor drive shaft 101*s*. The rotation speed of the front-left electric motor 10*l* can be determined by processing the signals detected by the front-left resolver 40*l*.

A pivot portion 101*p* is provided at the position symmetrical about the electric motor drive shaft 101*s* with the position of the motor-side bracket 101*b*. The pivot portion 101*p* is fit to a pivot receiving portion 28 of a transverse link (lower arm) 22 and secured using a pin. The transverse link 22 is attached to the vehicle body 1B via an attachment portion 27. As the front-left electric motor 10*l* moves up and down in the vertical direction (the direction indicated by the arrows Y in FIG. 2), the transverse link 22 pivots about a pivot axis Zsf at the attachment portion 27. Note that "vertical direction" is the direction that the gravity acts.

A front-wheel brake rotor 15 and a front wheel body 13 are fixed on the electric motor drive shaft 101*s*. A tire is attached to the front wheel body 13, whereby the front-left wheel 2*l* (FIG. 1) is formed. The front wheel body 13 moves up and down due to inputs from the road surface to the front-left wheel 2*l*. Because the front wheel body 13 is fixed on the electric motor drive shaft 101*s*, the front-left electric motor 10*l* also moves up and down as the front wheel body 13 moves up and down. Such vertical movement of the front-left electric motor 10*l* is absorbed by a spring 20S and the damper 20 of the front-wheel suspension assembly 8.

Because the front-left electric motor 10*l* and the transverse link 22 are secured to each other via the pin connection between the pivot portion 101*p* and the pivot receiving portion 28, the transverse link 22 pivots about the pivot axis Zsf as the front-left electric motor 10*l* moves up and down. Also, as a steering wheel 4 is operated, the front-left electric motor 10*l* is steered together with the front wheel body 13 and the tire. At this time, the pivot portion 101*p* turns on the pivot receiving portion 28. Next, the rear-wheel suspension assembly 9 will be described.

Referring to FIG. 3, the rear-wheel suspension assembly 9 of the first exemplary embodiment has a so-called torsion-beam suspension arrangement. The rear-right electric motor 11r is attached to one end of an arm 25 that is formed as a portion of a torsion beam 24. An attachment portion 26 is provided at the other end of the arm 25, that is, the end opposite from the end at which the rear-right electric motor 11r is attached. The arm 25 is attached to the vehicle body 1B via the vehicle attachment portion 26. The arm 25 pivots about a pivot axis Zsr at the vehicle attachment portion 26. The torsion beam 24 has a spring-damper receiving portion 21. The spring and damper of the rear-wheel suspension assembly 9 are provided between the spring-damper receiving portion 21 and the vehicle body 1B. In the first exemplary embodiment, the spring and damper of the rear-wheel suspension assembly 9 are integrally provided as a spring-damper assembly 29.

The rear-right resolver 41r is arranged on a drive shaft (electric motor drive shaft) 11rs of the rear-right electric motor 11r. The rear-right resolver 41r serves as a rotation angle detecting device for detecting the rotation angle of the electric motor drive shaft 11rs. The rotation speed of the rear-right electric motor 11r can be determined by processing the signals detected by the rear-right resolver 41r. A rear-wheel brake rotor 16 and a rear wheel body 14 are fixed on the electric motor drive shaft 11rs. A tire is attached on the rear wheel body 14, whereby the rear-right wheel 3r (FIG. 1) is formed.

The rear wheel body 14 moves up and down due to inputs from the road surface to the rear-right wheel 3r. Because the rear wheel body 14 is fixed on the electric motor drive shaft 11rs, the rear-right electric motor 11r also moves up and down as the rear wheel body 14 moves up and down. Such vertical movement of the rear-right electric motor 11r is transmitted to the spring-damper assembly 29 of the rear-wheel suspension assembly 9 via the spring-damper receiving portion 21 and absorbed by the spring-damper assembly 29. Note that the front-wheel suspension assembly 8 and the rear-wheel suspension assembly 9 are not limited to the suspension arrangements described above, but they may alternatively incorporate other suspension arrangements, such as multi-link suspension arrangements and double-wishbone suspension arrangements.

In the above-described configuration of the vehicle drive apparatus 100 where the front-left electric motor 10l, the front-right electric motor 10r, the rear-left electric motor 11l, and the rear-right electric motor 11r, which are drive force producing devices, are fixed to the respective suspension assemblies, the reaction forces against the drive forces produced by the electric motors at the respective drive wheels (will be referred to as "drive reaction forces") are mostly input to the suspension assemblies. As such, the vertical components of each drive wheel that are produced by the electric motor turn, with almost no loss, into drive reaction force components that act on the sprung of the vehicle. Next, other examples of the vehicle drive apparatus of the first exemplary embodiment will be described.

Figure 4:
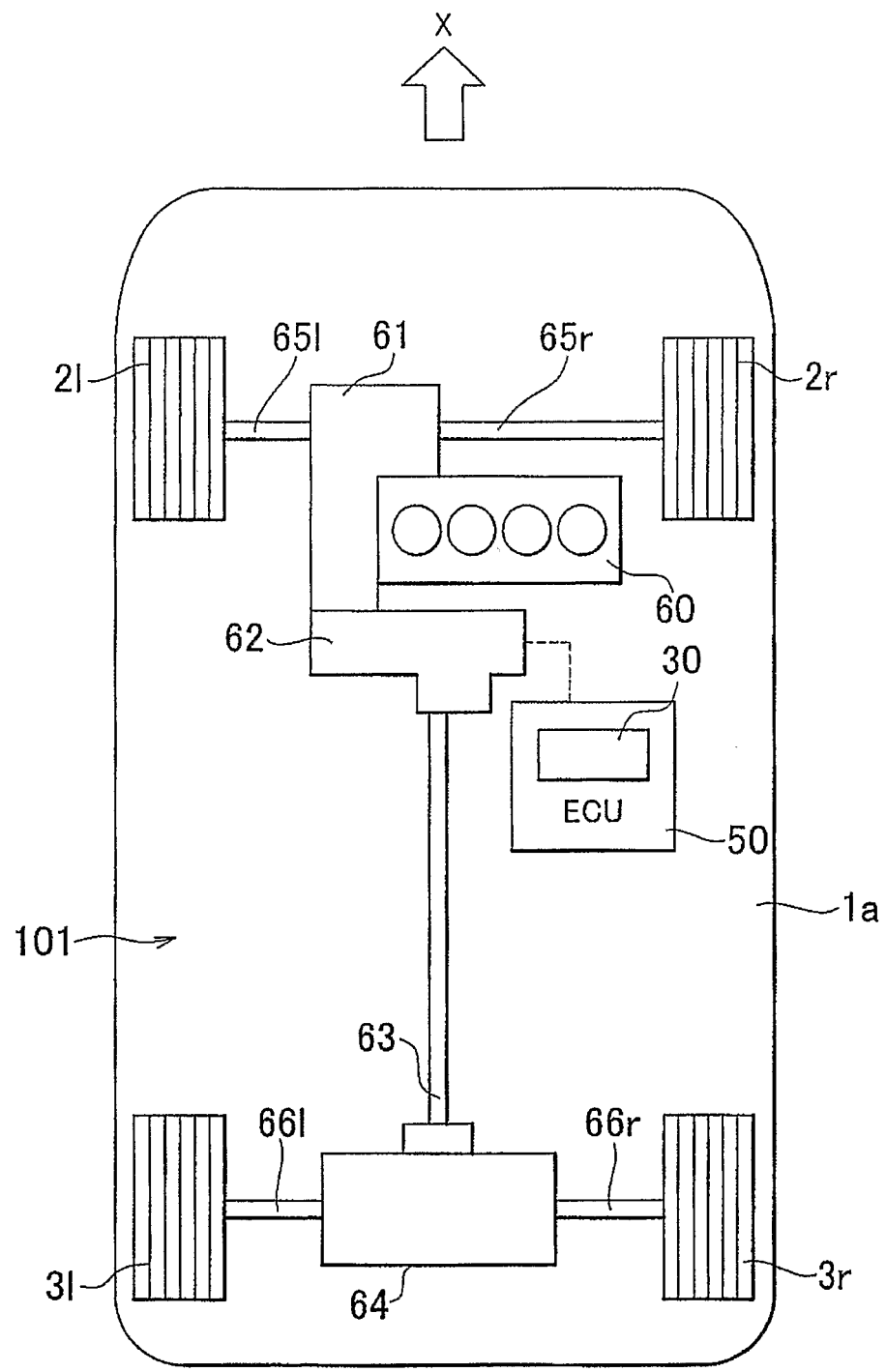
FIG. 4 is an illustrative view showing a modification example of the vehicle drive apparatus of the first exemplary embodiment.

FIG. 4 is an illustrative view showing a modification example of the vehicle drive apparatus of the first exemplary embodiment. This vehicle drive apparatus 101 uses an internal combustion engine 60 to produce drive force for propelling the vehicle. The vehicle drive apparatus 101 can change the distribution of drive force between the front wheel side and the rear wheel side, between the front wheels, and between the rear wheels, respectively. The output of the internal combustion engine 60 is transferred to a transmission 61 having a front-wheel drive force distribution device and then to a front-left wheel 2l and a front-right wheel 2r via a front-left drive shaft 65l and a front-right drive shaft 65r, respectively. The output of the internal combustion engine 60 is also output to a propeller shaft 63 via a front-rear drive force distribution device 62. The output of the internal combustion engine 60 is then transferred from the propeller shaft 63 to a rear-left wheel 3l and a rear-right wheel 3r via a rear-left wheel drive shaft 66l and a rear-right wheel drive shaft 66r, respectively.

The vehicle dynamics controller 30 of the ECU 50 determines the distribution ratio of drive force to the front-left wheel 2l, the front-right wheel 2r, the rear-left wheel 3l, and the rear-right wheel 3r, and the output of the internal combustion engine 60 is distributed at the determined ratio to the respective drive wheels via the transmission 61 having the front-wheel drive force distribution device, the front-rear drive force distribution device 62, and a rear-wheel drive force distribution device 64. In this modification example, the internal combustion engine 60, the front-rear drive force distribution device 62, and the rear-wheel drive force distribution device 64 together serve as a drive force producing device. Next, the method that the vehicle dynamics control of this exemplary embodiment implements to determine the drive force for each drive wheel will be described.

Figure 5A:
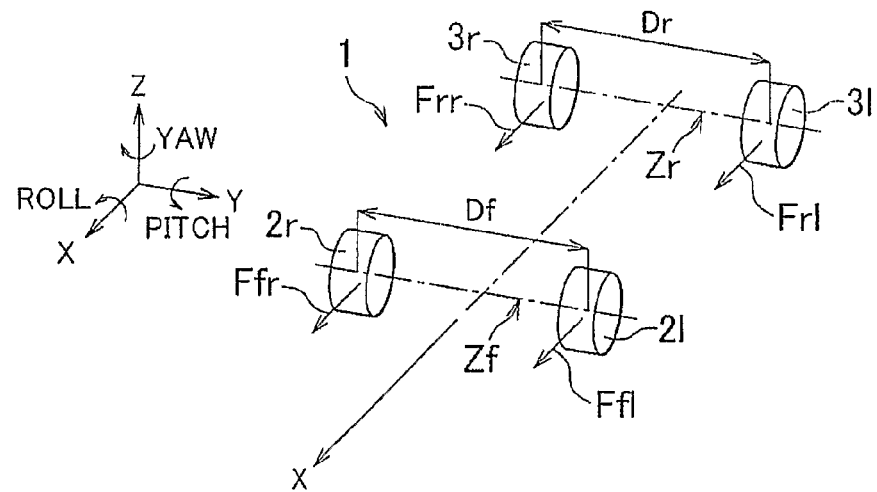
FIG. 5A is a conceptual view illustrating the vehicle dynamics control in the first exemplary embodiment.
Figure 5B:
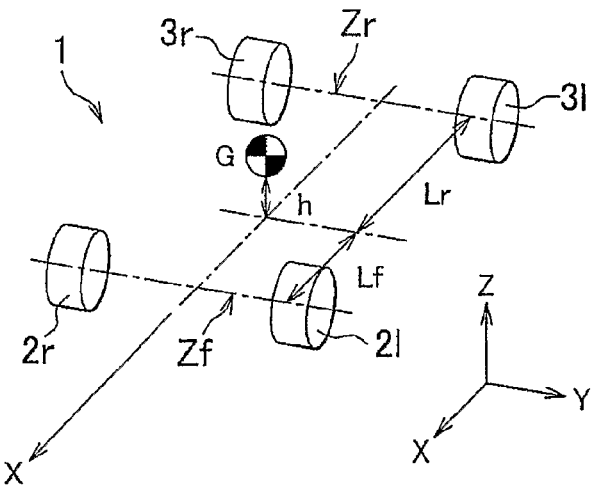
FIG. 5B is a conceptual view illustrating the vehicle dynamics control in the first exemplary embodiment.
Figure 5C:
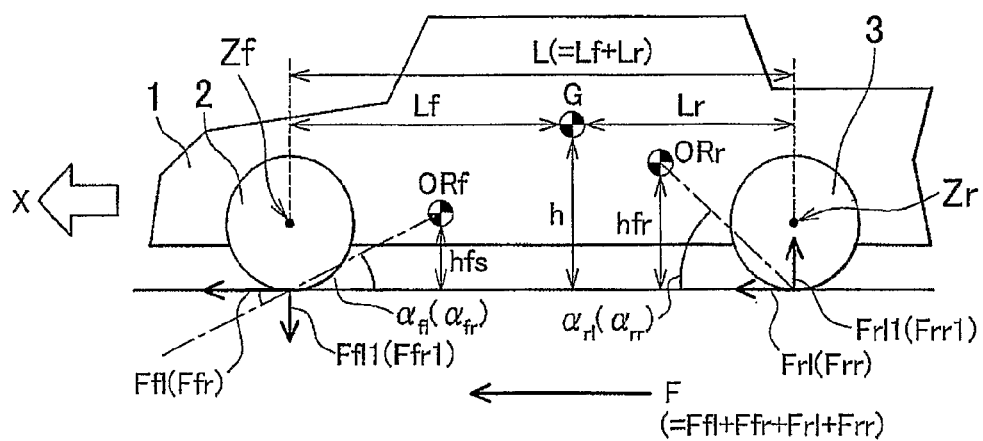
FIG. 5C is a conceptual view illustrating the vehicle dynamics control in the first exemplary embodiment.

FIG. 5A to FIG. 5C are conceptual views illustrating the vehicle dynamics control in the first exemplary embodiment. In FIG. 5A to FIG. 5C, "G" represents the gravity center of the vehicle 1, "h" represents the height of the gravity center of the vehicle 1, "ORf" represents an instantaneous rotation center of the front-wheel suspension assembly, "ORr" represents an instantaneous rotation center of the rear-wheel suspension assembly, "hfs" represents the height of the instantaneous rotation center of the front-wheel suspension assembly, "hfr" represents the height of the rotation center of the rear-wheel suspension assembly, "Df" represents the wheel track between the front wheels, and "Dr" represents the wheel track between the rear wheels. Further, "L" represents the distance (front-rear axle distance) between an axle Zf for the front-left wheel 2l and the front-right wheel 2r (front axle) and an axle Zr for the rear-left wheel 3l and the rear-right wheel 3r (rear axle), "Lf" represents the horizontal distance between the gravity center G and the axle Zf, and "Lr" represents the horizontal distance between the gravity center G and the axle Zr.

It is to be noted that "instantaneous rotation center" represents the instantaneous rotation center of each suspension assembly (the front-wheel suspension assembly 8, the rear-wheel suspension assembly 9) as viewed from the side of each suspension assembly, that is, as viewed from the wheels (the front-left wheel 2l, the rear-right wheel 3r). In other words, it is the instantaneous rotation center of each suspension assembly (the front-wheel suspension assembly 8, the rear-wheel suspension assembly 9) as viewed in the direction perpendicular to the direction that the vehicle 1 travels.

In the vehicle 1 of the first exemplary embodiment, the instantaneous rotation center height hfs of the front-wheel suspension assembly and the instantaneous rotation center height hfr of the rear-wheel suspension assembly are lower than the height h of the gravity center of the vehicle 1, and the instantaneous rotation center ORf of the front-wheel suspension assembly and the instantaneous rotation center ORr of the rear-wheel suspension assembly are located between the axle Zf and the axle Zr. Here, it is to be noted that the positions of the instantaneous rotation center ORf of the front-wheel suspension assembly and the instantaneous rotation center ORr of the rear-wheel suspension assembly are not limited to those described above.

In the vehicle dynamics control of the first exemplary embodiment, the yawing motion (motion around Z axis) and the rolling motion (motion around X axis) of the vehicle 1 are controlled by controlling the drive forces at the respective drive wheels. The simultaneous equations in the expression (1) are obtained from the drive forces Ffl, Ffr, Frl, and Frr for the respective drive wheels, a target yaw moment Mzref that is required to control the yawing motion, reactive forces against the drive forces at the respective drive wheels, a target roll moment Mxref that is required to control the rolling motion, the total drive force F for the vehicle 1 in the forward and reverse directions (the total drive force of the vehicle drive apparatus 100, will be referred to as "total drive force F"), and a distribution ratio i of the total drive force F between the front-wheel side and the rear-wheel side (will be referred to as "front-rear drive force distribution ratio i").

The target yaw moment Mzref can be expressed using the difference between the drive force Ffl for the front-left wheel 2l and the drive force Ffr for the front-right wheel 2r and the difference between the drive force Frl for the rear-left wheel 3l and the drive force Frr for the rear-right wheel 3r, that is, the difference between the drive force for the wheels on the left side and the drive force for the wheels on the right side of the vehicle 1. Likewise, the target roll moment Mxref can be expressed by the difference between the reaction force against the drive force Ffl at the front-left wheel 2l and the reaction force against the drive force Ffr at the front-right wheel 2r and the difference between the reaction force against the drive force Frl at the rear-left wheel 3l and the reaction force against the drive force Frr at the rear-right wheel 3r, that is, the difference between the drive reaction force at the wheels on the left side and the drive reaction force at the wheels on the right side of the vehicle 1.

The drive force Ffl is the drive force for the front-left wheel 2l (front-left wheel drive force), the drive force Ffr is the drive force for the front-right wheel 2r (front-right wheel drive force), the drive force Frl is the drive force for the rear-left wheel 31 (rear-left wheel drive force), and the drive force Frr is the drive force for the rear-right wheel 3r (rear-right wheel drive force). Solving the simultaneous equations in the expression (1) determines the drive forces Ffl, Ffr, Frl, and Frr that are required at the respective drive wheels to achieve the target yaw moment Mzref and the target roll moment Mxref.

In the above equations, "$\alpha_{fl}$" represents the instantaneous rotation center angle of the front-wheel suspension assembly 8 supporting the front-left wheel 2l, "$\alpha_{fr}$" represents the instantaneous rotation center angle of the front-wheel suspension assembly 8 supporting the front-right wheel 2r, "$\alpha_{rl}$" represents the instantaneous rotation center angle of the rear-wheel suspension assembly 9 supporting the rear-left wheel 3l, and "$\alpha_{rr}$" represents the instantaneous rotation center angle of the rear-wheel suspension assembly 9 supporting the rear-right wheel 3r. "Fflxtan $\alpha_{rl}$" represents the reaction force against the drive force Ffl at the front-left wheel 2l (front-left wheel drive reaction force), "Ffrxtan $\alpha_{fr}$" represents the reaction force against the drive force Ffr at the front-right wheel 2r (front-right wheel drive reaction force), "Frlxtan $\alpha_{rl}$" represents the reaction force against the drive force Frl at the rear-left wheel 3l (rear-left wheel drive reaction force), and "Frrxtan $\alpha_{rr}$" represents the reaction force against the drive force Frr at the rear-right wheel 3r (rear-right wheel drive reaction force).

The expression (1) is modified depending upon the type of the vehicle drive system. For example, in the case of a vehicle having a front-wheel drive apparatus or a vehicle having a drive apparatus that can change the distribution of drive force only between the front-left wheel and the front-right wheel, the rear-left drive force Frl, the rear-right drive force Frr, and the rear-wheel track Dr, the rear-left wheel drive reaction force Frlxtan $\alpha_{rl}$, and the rear-right wheel drive reaction force Frrxtan $\alpha_{rr}$, and the front-rear drive force distribution ratio i in the expression (1) are all zeroed. On the other hand, in the case of a vehicle having a rear-wheel drive apparatus or a vehicle having a drive apparatus that can change the distribution of drive force only between the rear-left wheel and the rear-right wheel, the front-left drive force Ffl, the front-right drive force Ffr, and the front-wheel track Df, the front-left wheel drive reaction force Fflxtan $\alpha_{fl}$, and the front-right wheel drive reaction force Ffrxtan $\alpha_{fr}$, and the front-rear drive force distribution ratio i in the expression (1) are all zeroed.

When the equations in the expression (1) are expressed in the form of a matrix, the expression (2) is obtained. When the first matrix of the right side of the expression (2) is designated as "A", if front-rear drive force distribution ratio i≠0.5, rank (A) is 4. This indicates that the matrix A is regular and the simultaneous equations in the expression (1) are therefore solvable. In this case, as shown in the expression (3), $A^{-1}$, which is an inverse matrix of A, is multiplied by each side of the expression (2) from the left side, whereby the drive forces Ffl, Ffr, Frl, and Frr required to achieve the target yaw moment Mzref and the target roll moment Mxref are determined.

$$\begin{cases} F = Ffl + Ffr + Frl + Frr \\ Mzref = \dfrac{Df}{2}(Ffr - Ffl) + \dfrac{Dr}{2}(Frr + Frl) \\ Mxref = \dfrac{Df}{2}(Ffr\tan\alpha_{fr} - Ffl\tan\alpha_{fl}) - \dfrac{Df}{2}(Frr\tan\alpha_{rr} - Frl\tan\alpha_{rl}) \\ (Ffl + Ffr) = (Frl + Frr) = i = (1 - i) \end{cases}$$

Expression (1)

$$\begin{bmatrix} F \\ Mzref \\ Mxref \\ 0 \end{bmatrix} = \underbrace{\begin{bmatrix} 1 & 1 & 1 & 1 \\ -\dfrac{Df}{2} & \dfrac{Df}{2} & -\dfrac{Dr}{2} & \dfrac{Dr}{2} \\ -\dfrac{Df}{2}\tan\alpha_{fl} & \dfrac{Df}{2}\tan\alpha_{fr} & +\dfrac{Dr}{2}\tan\alpha_{rl} & -\dfrac{Dr}{2}\tan\alpha_{rr} \\ 1-i & 1-i & -i & -i \end{bmatrix}}_{A} \begin{bmatrix} Ffl \\ Ffr \\ Frl \\ Frr \end{bmatrix}$$

Expression (2)

-continued $$\begin{bmatrix} Ffl \\ Ffr \\ Frl \\ Frr \end{bmatrix} = \begin{bmatrix} 1 & 1 & 1 & 1 \\ -\dfrac{Df}{2} & \dfrac{Df}{2} & -\dfrac{Dr}{2} & \dfrac{Dr}{2} \\ -\dfrac{Df}{2}\tan\alpha_{fl} & \dfrac{Df}{2}\tan\alpha_{fl} & +\dfrac{Dr}{2}\tan\alpha_{rl} & -\dfrac{Dr}{2}\tan\alpha_{rr} \\ 1-i & 1-i & -i & -i \end{bmatrix}^{-1} \begin{bmatrix} F \\ Mzref \\ Mxref \\ 0 \end{bmatrix} \quad \text{Expression (3)}$$

For example, if front-rear drive force distribution ratio i=0.5, rank (A)≠4 is true and therefore the simultaneous equations in the expression (1) are unsolvable. In this case, therefore, it is impossible to determine the drive forces Ffl, Ffr, Frl, and Frr for the respective drive wheels that are required to achieve the target yaw moment Mzref and the target roll moment Mxref. Thus, the drive forces Ffl, Ffr, Frl, and Frr for the respective drive wheels are determined so as to achieve one of the target yaw moment Mzref and the target roll moment Mxref. The expression (4) is used to determine the drive forces Ffl, Ffr, Frl, and Frr for the respective drive wheels that are required to achieve the target roll moment Mxref. The expression (5) is used to determine the drive forces Ffl, Ffr, Frl, and Frr for the respective drive wheels that are required to achieve the target yaw moment Mzref.

Here, note that "j" in the expression (4) represents a left-right drive force difference front-rear allocation ratio, which is one of dynamic load allocation ratios between the front-wheel side and the rear-wheel side of the vehicle 1. Specifically, the left-right drive force difference front-rear allocation ratio j is the ratio at which the target difference between the drive force at the wheels on the left side (the front-left wheel 2l, the rear-left wheel 3l) and the drive force at the wheels on the right side (the front-right wheel 2r, the rear-right wheel 3r) is allocated to the front wheels (the front-left wheel 2l, the front-right wheel 2r) and to the rear wheels (the rear-left wheel 3l, the rear-right wheel 3r). For example, when the target difference between the drive force at the left side wheels and the drive force at the right side wheels is 10, the left-right drive force difference front-rear allocation ratio j is set so as to allocate 6 to the front wheels and 4 to the rear wheels.

Figure 6:
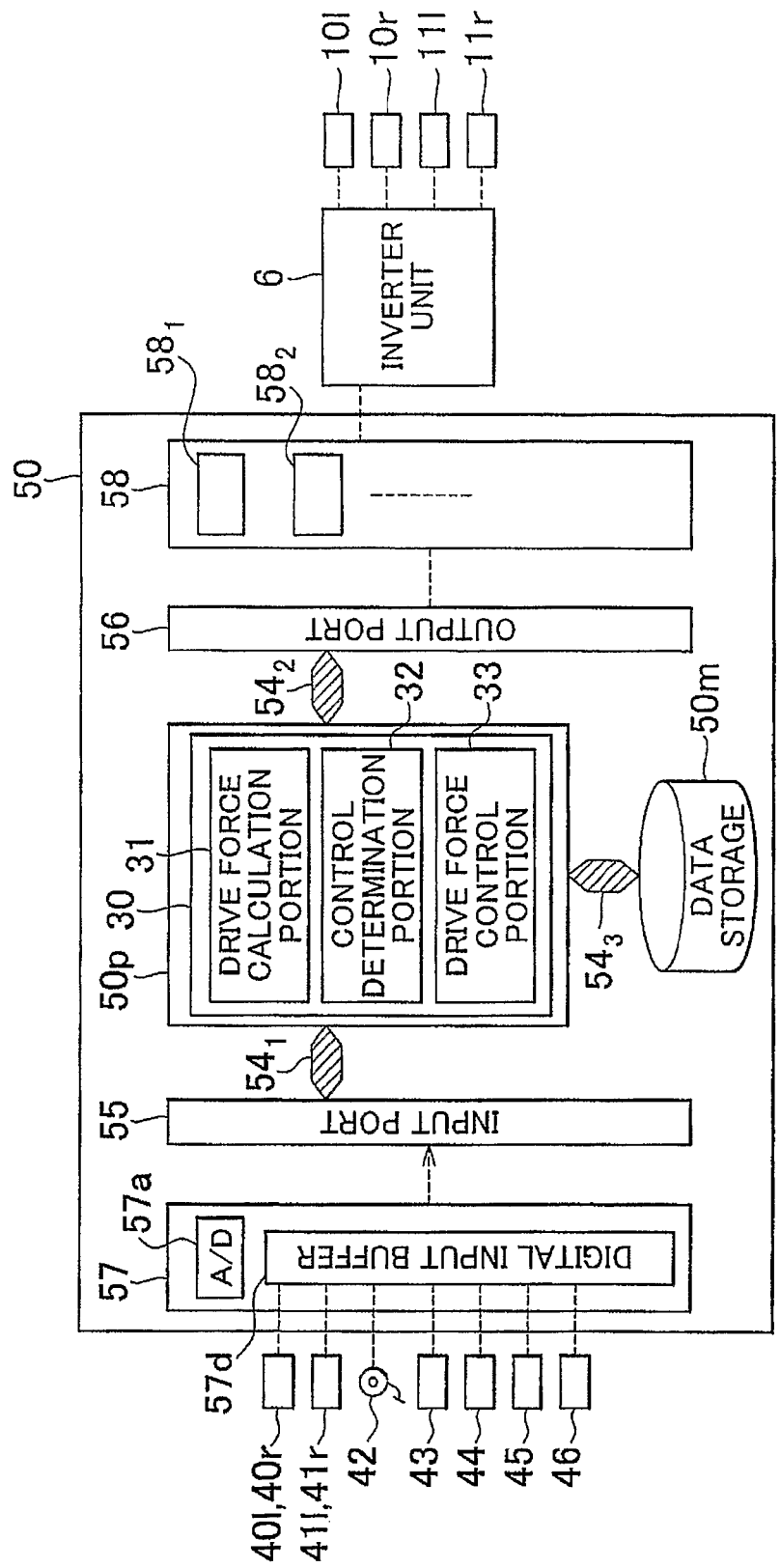
FIG. 6 is an illustrative view showing an exemplary configuration of the vehicle dynamics controller in the first exemplary embodiment.

FIG. 6 is an illustrative view showing an exemplary configuration of the vehicle dynamics controller 30 in the first exemplary embodiment. As shown in FIG. 6, the vehicle dynamics controller 30 is incorporated in the ECU 50. The ECU 50 includes a CPU (Central Processing Unit) 50p, a data storage 50m, an input port 55, an output port 56, an input interface 57, and an output interface 58.

Note that the vehicle dynamics controller 30 may be provided separate from the ECU 50. In this case, for example, the vehicle dynamics controller 30 is connected to the ECU 50 so that the vehicle dynamics controller 30 can utilize the function of the ECU 50 for controlling the vehicle drive apparatus 100, etc., in order to perform the vehicle dynamics control of the first exemplary embodiment.

The vehicle dynamics controller 30 includes a drive force calculation portion 31, a control determination portion 32, and a drive force control portion 33. These portions serve to perform the vehicle dynamics control of the first exemplary embodiment. In the first exemplary embodiment, the vehicle dynamics controller 30 is provided as a portion of the CPU 50p of the ECU 50.

The drive force calculation portion 31, the control determination portion 32, and the drive force control portion 33 of the vehicle dynamics controller 30 are connected to each other via a bus 54₁, a bus 54₂, the input port 55, and the output port 56. Thus, among the drive force calculation portion 31, the control determination portion 32, and the drive force control portion 33 of the vehicle dynamics controller 30, various control data are mutually exchanged and commands are provided from one to the other. The vehicle dynamics controller 30 of the CPU 50p and the data storage 50m are connected to each other via a bus 54₃. Thus, the vehicle $$\begin{bmatrix} Ffl \\ Ffr \\ Frl \\ Frr \end{bmatrix} = \begin{bmatrix} 1 & 1 & 1 & 1 \\ 1-j & 1-j & -j & j \\ -\dfrac{Df}{2}\tan\alpha_{fl} & \dfrac{Df}{2}\tan\alpha_{fl} & \dfrac{Dr}{2}\tan\alpha_{rl} & -\dfrac{Dr}{2}\tan\alpha_{rr} \\ 1-i & 1-i & -i & -i \end{bmatrix}^{-1} \begin{bmatrix} F \\ 0 \\ Mxref \\ 0 \end{bmatrix} \quad \text{Expression (4)}$$

$$\begin{bmatrix} Ffl \\ Ffr \\ Frl \\ Frr \end{bmatrix} = \begin{bmatrix} 1 & 1 & 1 & 1 \\ -\dfrac{Df}{2} & \dfrac{Df}{2} & -\dfrac{Dr}{2} & \dfrac{Dr}{2} \\ -(1-j)Df & (1-j)Df & -jDr & jDr \\ 1-i & 1-i & -i & -i \end{bmatrix}^{-1} \begin{bmatrix} F \\ Mzref \\ 0 \\ 0 \end{bmatrix} \quad \text{Expression (5)}$$

As such, using the expressions (3) to (5), it is possible to determine the drive forces Ffl, Ffr, Frl, and Frr for the respective drive wheels that are required to achieve at least one of the target yaw moment Mzref and the target roll moment Mxref. Then, at least one of the yawing motion and the rolling motion of the vehicle is controlled based on the front-rear drive force distribution ratio i and the state or drive conditions of the vehicle 1. Next, a description will be made of the vehicle dynamics controller 30 that performs the foregoing vehicle dynamics control of the first exemplary embodiment.

dynamics controller 30 can obtain operation control data of the vehicle drive apparatus 100 from the ECU 50 and use the obtained data. Also, the vehicle dynamics controller 30 can cause the vehicle dynamics control of the first exemplary embodiment to be executed as an interrupt during the operation control routine executed by the ECU 50.

The input interface 57 is connected to the input port 55. Various sensors and sensing devices are connected to the input interface 57, which include the front-left resolver 40l, the front-right resolver 40r, the rear-left resolver 41l, the rear-right resolver 41*r*, the accelerator operation amount sensor 42, a steering angle sensor 43, a vehicle speed sensor 44, a longitudinal acceleration sensor 45, a lateral acceleration sensor 46, and other sensors for obtaining information necessary for controlling the operation of the vehicle drive apparatus 100. The outputs of these sensors and sensing devices are converted by an A/D converter 57*a* and a digital input buffer 57*d* into signals that the CPU 50*p* can process, and the converted signals are then sent to the input port 55. Thus, the CPU 50*p* obtains information necessary for the operation control of the vehicle drive apparatus 100 and for the vehicle dynamics control of the first exemplary embodiment.

The output interface 58 is connected to the output port 56. A control object for the vehicle dynamics control is connected to the output interface 58. In the first exemplary embodiment, the control object for the vehicle dynamics control is the inverter unit 6 that controls the front-left electric motor 10*l*, the front-right electric motor 10*r*, the rear-left electric motor 11*l*, and the rear-right electric motor 11*r*. The output interface 58 includes control circuits 58$_1$, 58$_2$ and the control object operates in accordance with the control signals computed by the CPU 50*p*. According to this structure, the CPU 50*p* of the ECU 50 controls the drive forces of the front-left electric motor 10*l*, the front-right electric motor 10*r*, the rear-left electric motor 11*l*, and the rear-right electric motor 11*r* based on the signals output from the sensors and sensing devices described above.

The data storage 50*m* stores computer programs including instructions for the processes of the vehicle dynamics control of the first exemplary embodiment, control maps, and data regarding drive force distribution ratios used in the vehicle dynamics control of the first exemplary embodiment. The data storage 50*m* may be constituted by, for example, a volatile memory (e.g., RAM (Random Access Memory)), a non-volatile memory (e.g., flash memory), or the combination of them.

The above-stated computer programs may be computer programs that are used in combination with computer programs stored in the CPU 50*p* to provide the control processes of the vehicle dynamics control of the first exemplary embodiment. Also, the drive force calculation portion 31, the control determination portion 32, and the drive force control portion 33 may be provided as hardware sections or components in the vehicle dynamics controller 30, rather than as the computer programs. Next, the vehicle dynamics control of the first exemplary embodiment will be described. In the following description, refer also to FIG. 1 to FIG. 6 as needed.

Figure 7:
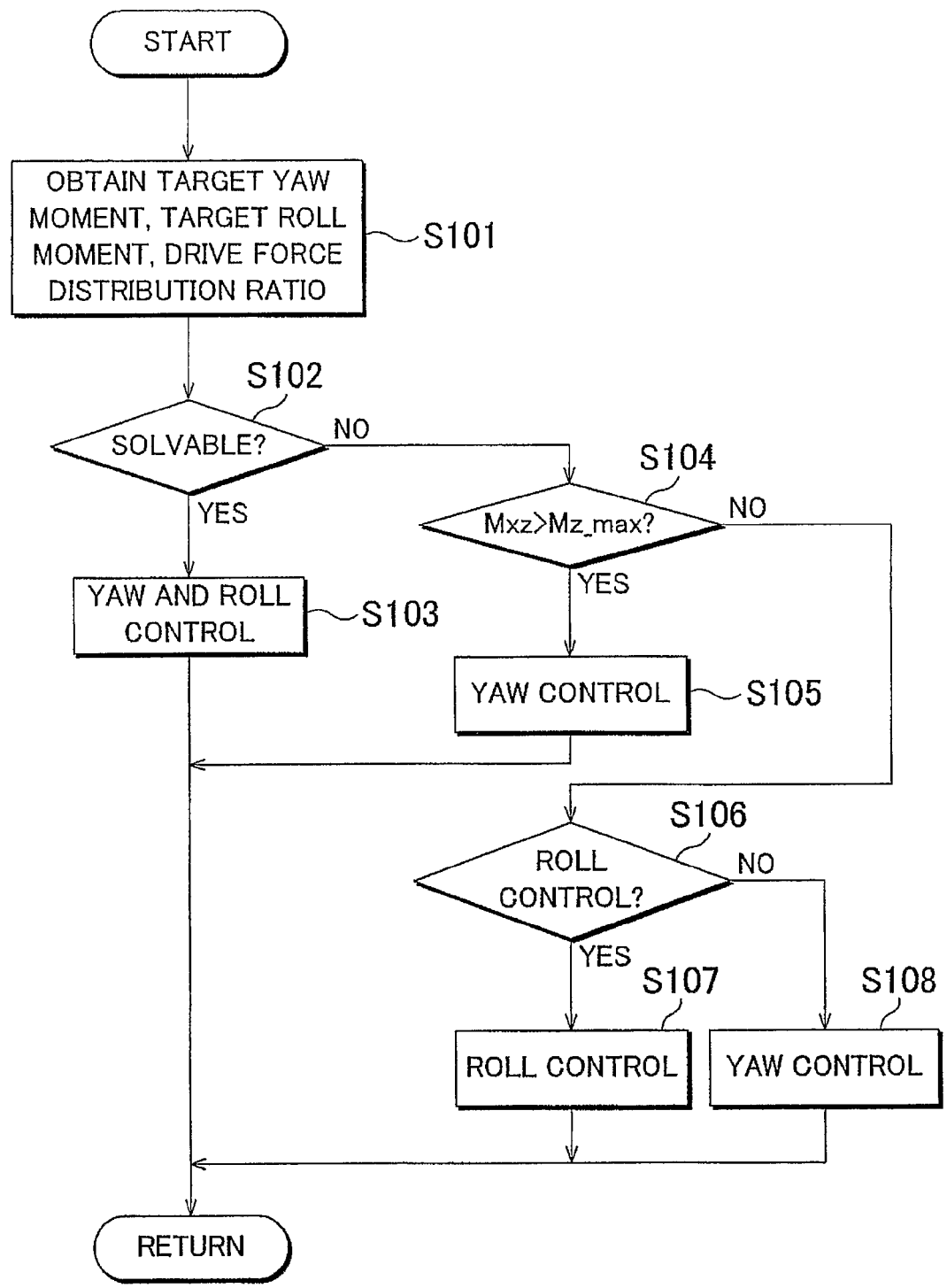
FIG. 7 is a flowchart showing a vehicle control procedure in the first exemplary embodiment.
Figure 8:
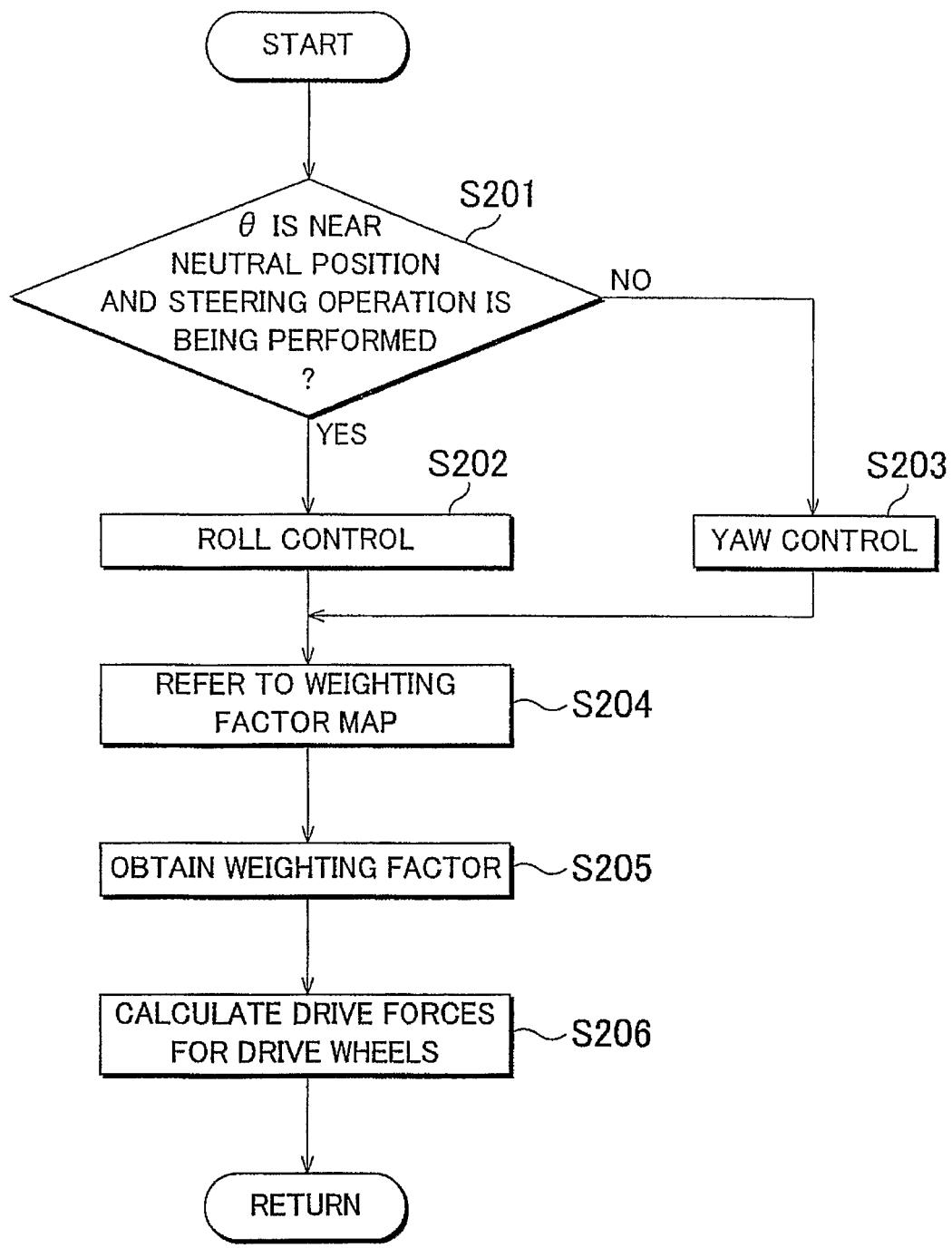
FIG. 8 is a flowchart showing a vehicle control procedure in the first exemplary embodiment.

FIG. 7 and FIG. 8 are flowcharts showing the vehicle control procedure in the first exemplary embodiment. When executing the vehicle dynamics control of the first exemplary embodiment, the vehicle dynamics controller 30 obtains the target yaw moment Mzref, the target roll moment Mxref, and the front-rear drive force distribution ratio i (step 101). The target yaw moment Mzref is obtained by multiplying the target yaw rate γref of the expression (6) by a yaw inertia moment Iz, and the target roll moment Mxref is obtained by multiplying the target roll rate φref of the expression (7) by a roll inertia moment Ix.

As evident from the expressions (6) and (7), the target yaw rate γref and the target roll rate φref can be obtained by using the vehicle speed V of the vehicle 1 and the steering angle θ of the steerable wheels (front wheels) of the vehicle 1 as control parameters. The vehicle speed V of the vehicle 1 is obtained from the vehicle speed sensor 44 and the steering angle θ is obtained from the steering angle sensor 43.

In the expressions (6) and (7), "V" represents the vehicle speed, "Kφ" represents the roll rigidity of the vehicle, "hs" represents the distance from the roll axis of the vehicle to the gravity center of the vehicle, "g" represents the gravitational acceleration, "n" represents the steering gear ratio, "γ" represents the yaw rate, "φ" represents the roll angle, "Kf" represents the cornering power of the front wheels, "Kr" represents the cornering power of the rear wheels, "kf" is a stability factor of the vehicle, "Ms" represents the sprung mass of the vehicle, "θ" represents the steering angle of the steerable wheels of the vehicle, and "Ixz" represents the yaw/roll inertia moment.

$$\gamma_{ref} = \frac{V}{L(1+khV^2)} \frac{\theta}{n} \quad \text{Expression (6)}$$

$$\phi'_{ref} = \frac{V^2 M_s h_s}{L(1+khV^2)K\phi - M_s g h_s} \frac{\theta'}{n} \quad \text{Expression (7)}$$

Next, the method for obtaining the target roll rate φref' will be described. When the yaw rate γ and a slip angle β of the vehicle 1 (will be referred to as "vehicle body slip angle β") are inputs, the response φ (S) of the roll angle φ is expressed as the expression (8). "Gφ(0)" is expressed as the expression (9), "ξφ" is expressed as the expression (10), "ωφ" is expressed as the expression (11), and "Tφ" is expressed as the expression (12).

$$\phi(S) = G\phi(0) = \frac{S}{1 + 2\frac{\xi\phi}{\varpi\phi}S + \frac{S^2}{\varpi\phi^2}} \beta(S) + \quad \text{Expression (8)}$$

$$G\phi(0) \frac{T\phi S + 1}{1 + 2\frac{\xi\phi}{\varpi\phi}S + \frac{S^2}{\varpi\phi^2}} \gamma(S)$$

$$G\phi(0) = \frac{M_s h_s}{K\phi - M_s g h_s} \quad \text{Expression (9)}$$

$$\xi\phi = \frac{1}{2} \frac{C\phi}{\sqrt{I_x(K\phi - M_s g h_s)}} \quad \text{Expression (10)}$$

$$\varpi\phi = \sqrt{\frac{K\phi - M_s g h_s}{I_x}} \quad \text{Expression (11)}$$

$$T\phi = \frac{Ixz}{M_s hsV} \quad \text{Expression (12)}$$

When the steering angle θ of the steerable wheels (front wheel) (will be simply referred to as "steering angle θ") is an input, the response γ (S) of the yaw rate γ is expressed as the expression (13), and the response β (S) of the vehicle body slip angle β is expressed as the expression (14). "Gγ (0)" is expressed as the expression (15), "Gβ (0)" is expressed as the expression (16), "ξ" is expressed as the expression (17), and "ω" is expressed as the expression (18). When the expression (8) is reformulated using the expressions (9) to (18), the response φ (S) of the toll angle φ is expressed as the expression (19).

$$\gamma(S) = G_\gamma(0) \frac{1 + T_\gamma S}{1 + 2\frac{\xi}{\omega}S + \frac{S^2}{\omega^2}} \theta(S) \quad \text{Expression (13)}$$

-continued $$\beta(S) = G_\beta(0)\frac{1+T_\beta S}{1+2\frac{\xi}{\omega}S+\frac{S^2}{\omega^2}}\theta(S) \quad \text{Expression (14)}$$

$$G\gamma(0) = \frac{V^2}{n(1+khV^2)L} \quad \text{Expression (15)}$$

$$G\beta(0) = \frac{2K_rL_rL - ML_fV^2}{2nK_r(1+khV^2)L^2} \quad \text{Expression (16)}$$

$$\xi = \frac{1}{2L}\frac{M(L_f^2 K_f + L_r^2 K_r) + I_z(K_f + K_r)}{\sqrt{MLK_fK_r(1+khV^2)}} \quad \text{Expression (17)}$$

$$\omega = \sqrt{\frac{4K_fK_rL^2 + 4V^2K_fK_rkhL^2}{MI_zV^2}} \quad \text{Expression (18)}$$

$$\phi(S) = G\phi(0)G\gamma(0)\frac{1+\left(\frac{T_\phi+T_\gamma}{G\phi(0)G\gamma(0)}+\frac{G\beta(0)}{G\gamma(0)}\right)S+\left(T_\beta\frac{G\beta(0)}{G\gamma(0)}+\frac{T_\phi+T_\gamma}{G\phi(0)G\gamma(0)}\right)S^2}{\left(1+2\frac{\xi\phi}{\varpi\phi}S+\frac{S^2}{\varpi\phi^2}\right)\left(1+2\frac{\xi}{\omega}S+\frac{S^2}{\omega^2}\right)}\theta(S) \quad \text{Expression (19)}$$

The response of the roll angle φ to the input steering angle θ can be determined by the expression (19). Here, the target roll angle φref is defined as the value obtained by multiplying a steady-state gain Gφ (0) Gγ (0) by the steering angle θ. That is, the target roll angle φref is expressed as the expression (20). As evident from the expression (20), the target roll angle φref can be obtained by a transfer function for the input steering angle θ without factoring in delays.

$$\phi ref = G\phi(0)G\gamma(0)\theta \quad \text{Expression (20)}$$

The target roll rate is obtained by differentiating the target roll angle φref. Specifically, in the expression (21), the target roll rate φref' is obtained by differentiating the input steering angle θ by using the steady-state gain Gφ (0) and Gγ (0) as a constant. Then, when "Gφ (0)" in the expression (21) is replaced with the expression (9) and "Gγ (0)" in the expression (21) is replaced with the expression (15), it gives the target roll rate φref' of the expression (7).

$$\phi ref' = G\phi(0)G\gamma(0)\theta' \quad \text{Expression (21)}$$

The control determination portion 32 of the vehicle dynamics controller 30 obtains the front-rear drive force distribution ratio i that has been determined by the drive force calculation portion 31 and applies it to the matrix A of the expression (2) to determine whether the simultaneous equations in the expression (1) are solvable (step 102). That is, if rank (A)=4, the simultaneous equations in the expression (1) are solvable. If the simultaneous equations in the expression (1) are solvable (step 102: YES), it is possible to achieve both of the target yaw moment Mzref and the target roll moment Mxref.

In this case, the drive force calculation portion 31 obtains the total drive force F for the vehicle 1 and determines the drive forces Ffl, Ffr, Frl, and Frr for the respective drive wheels by applying the target yaw moment Mzref, the target roll moment Mxref, and the front-rear drive force distribution ratio i, which have been obtained in step 101, and the total drive force F to the expression (3). Then, the drive force control portion 33 of the vehicle dynamics controller 30 determines the outputs of the front-left electric motor 10l, the front-right electric motor 10r, the rear-left electric motor 11l, and the rear-right electric motor 11r such that the determined drive forces Ffl, Ffr, Frl, and Frr are produced at the respective drive wheels of the vehicle 1. Then, the drive force control portion 33 drives the front-left electric motor 10l, the front-right electric motor 10r, the rear-left electric motor 11l, and the rear-right electric motor 11r so as to produce the determined outputs. As such, the yawing and rolling of the vehicle 1 are simultaneously controlled (step 103) so that the steering perforce required by the driver is achieved while suppressing the rolling of the vehicle 1. Note that the total drive force F for the vehicle 1 can be determined based on the electric power supplied to the respective electric motors of the vehicle 1.

On the other hand, if it is determined in step 102 that the simulations equations in the expression (1) are not solvable (step 102: NO), that is, if rank (A)≠4, it is impossible to achieve the target yaw moment Mzref and the target roll moment Mxref at the same time. In this case, therefore, the control is performed so as to achieve one of the target yaw moment Mzref and the target roll moment Mxref. In the following, the control for achieving the target yaw moment Mzref will be referred to as "yaw control", and the control for achieving the target roll moment Mxref will be referred to as "roll control".

In this exemplary embodiment, when it is impossible to achieve both of the target yaw moment Mzref and the target roll moment Mxref, the control is performed to achieve the target roll moment Mxref so that the rolling of the vehicle 1 is suppressed. At this time, if the yaw moment of the vehicle 1 that is estimated to arise due to the drive forces to be produced at the respective drive wheels to achieve the target roll moment Mxref to control the rolling of the vehicle 1 is larger than an upper limit yaw moment (upper yaw moment limit value) Mz_max, the vehicle 1 is very likely to spin. To cope with this, if Mxz>Mz_max, priority is given to achieving the target yaw moment Mzref in order to stabilize the behavior of the vehicle 1.

If the simultaneous equations in the expression (1) are not solvable (step 102: NO), the drive force calculation portion 31 obtains, by solving the expression (4), the drive forces Ffl, Ffr, Frl, and Frr for the respective drive wheels that are needed to achieve the target roll moment Mxref. Then, the control determination portion 32 determines a yaw moment Mxz that will arise on the vehicle 1 due to the drive forces Ffl, Ffr, Frl, and Frr for the respective drive wheels, which have been determined by the drive force calculation portion 31, and then compares the yaw moment Mxz with the upper yaw moment limit value Mz_max (step 104).

If Mxz>Mz_max (step 104: YES), the vehicle 1 is very likely to spin. Therefore, the control determination portion 32 determines to perform the control so as to achieve the target yaw moment Mzref, not the target roll moment Mxref. In response to this determination, the drive force calculation portion 31 determines, by solving the expression (5), the drive forces Ffl, Ffr, Frl, and Frr for the respective drive wheels which are needed to achieve the target yaw moment Mzref. Then, the drive force control portion 33 drives the front-left electric motor 10l, the front-right electric motor 10r, the rear-left electric motor 11l, and the rear-right electric motor 11r such that the determined drive forces Ffl, Ffr, Frl, and Frr are produced at the respective drive wheels of the vehicle 1. Thus, the yawing of the vehicle 1 is controlled (step 105) so as to eliminate the possibility of spinning of the vehicle 1 and thus enable the vehicle 1 to turn in a stable manner.

On the other hand, if Mxz≤Mz_max (step 104: NO), whether to perform the roll control or the yaw control (step 106) is determined. At this time, the determination is made in consideration of the drive state of the vehicle 1. More details will hereinafter be described with reference to FIG. 8. The drive state of the vehicle 1 is determined from the steering angle θ and the state of the steering operation. This enables the motion and posture of the vehicle 1 to be controlled in accordance with the intention of the driver of the vehicle 1.

The control determination portion 32 obtains the steering angle θ from the steering angle sensor 43 and determines whether the steering angle θ is in the vicinity of the neutral position and the steering operation is being performed (step 201). Regarding the determination as to whether the steering angle θ is in the vicinity of the neutral position, for example, if the steering angle θ is equal to or less than a threshold (e.g., ±5 or so), the steering angle θ is determined to be in the vicinity of the neutral position. With regard to the determination as to the state of the steering operation, for example, it is determined that the steering operation is being performed if a time differential value dθ/dt that is obtained by differentiating the steering angle θ with respect to time is not 0 (dθ/dt≠0). Note that the time differential value dθ/dt of the steering angle represents the velocity of the steering angle.

When the steering angle θ is in the vicinity of the neutral position and the steering operation is being performed (step 201: YES), the roll control is performed (step 202). As such, the rolling of the vehicle 1 is suppressed in a region of slight steering operation, so that vehicle rolling that occurs during an initial period of turning, vehicle rolling that occurs upon lane change, and the like, are suppressed, and therefore the behavior of the vehicle 1 is stabilized.

If the steering angle θ is not in the vicinity of the neutral position (i.e., if the steering angle θ is larger than the threshold), or if the steering operation is not being performed (dθ/dt=0) (i.e., the steering angle θ remains constant) (step 201: NO), the yawing control is then performed (step 203). As such, a desired yaw gain is obtained with respect to the steering angle θ. As such, the vehicle turns in a manner reflecting the intention of the driver when he or she is steering the steering wheel by a large steering angle θ.

In the case where the control is switched, through the determinations described above, between the roll control and the yaw control, if the control is switched between the roll control and the yaw control discontinuously, it may deteriorate the drivability of the vehicle 1 and make the behavior of the vehicle 1 unstable. To counter this, in this exemplary embodiment, the drive force for each drive wheel is multiplied by a weighting factor, so that the control is switched between the roll control and the yaw control continuously. The waiting factor Y is a factor for determining the ratio of the yaw control and varies in the range of 0 to 1. Once the weighting factor Y has been determined, the ratio of the roll control can be determined as (1−Y).

FIG. 9 is a chart illustrating one example of a weighting factor map describing values of the weighting factor Y. The weighting factor map 70 is stored in the data storage 50m of the ECU 50. The weighting factor map 70 describes the values of the weighting factor Y that have been determined based on the steering angle θ and the transient state of the steering operation (i.e., the time differential value dθ/dt of the steering angle θ). Here, note that $B_0(=0)<B_1<B_2<B_3<B_4<B_5$, and $B_0(=0)<B_1<B_2<B_3<B_4<B_5$, and that the weighting factor Y is $Y_1(=0)<Y_2<Y_3<Y_4(=1)$. That is, as the steering angle θ increases and dθ/dt=θ approaches zero, the ratio of the yaw control increases.

The drive force for each drive wheel is determined using the weighting factor Y in the following manner. For example, when determining the front-left wheel drive force Ffl, the drive force needed to produce a target roll moment (the drive force obtained by solving the expression (4)) is denoted as "Ffl_r", and the drive force needed to produce a target yaw moment (the drive force obtained by solving the expression (5)) is denoted as "Ffl_y".

When the drive force Ffl is expressed using the weighting factor Y, Ffl=(1−Y)×Ffl_r+Y×Ffl_y is obtained. The same applies when determining the drive forces Ffr, Flr, Frr for other drive wheels. As such, the control is continuously switched between the roll control and the yaw control, and this reduces the possibility of deterioration of the drivability and the possibility of the behavior of the vehicle 1 becoming unstable.

After whether to perform the roll control or the yaw control has been determined (step 202 or step 203), the drive force calculation portion 31 then obtains the steering angle θ and its time differential value θ' (=dθ/dt), and applies them to the weighting factor map 70 (step 204). Then, the drive force calculation portion 31 obtains the value of the weighting factor Y corresponding to the steering angle θ and the time differential value θ' (step 205), and calculates the drive force for each drive wheel using the weighting factor Y (step 206).

In step 106, whether to perform the roll control or the yaw control is determined through the processes in step 201 to step 206 described above. When the roll control is performed (step 106: YES, step 201: YES), the drive force control portion 33 drives the front-left electric motor 10*l*, the front-right electric motor 10*r*, the rear-left electric motor 11*l*, and the rear-right electric motor 11*r* such that the drive forces Ffl, Ffr, Frl, and Frr that have been determined in step 204 to step 206 are produced at the respective drive wheels of the vehicle 1 (step 107). On the other hand, when the yaw control is performed (step 106: NO, step 201: NO), the drive force control portion 33 drives the front-left electric motor 10*l*, the front-right electric motor 10*r*, the rear-left electric motor 11*l*, and the rear-right electric motor 11*r* such that the drive forces Ffl, Ffr, Frl, and Frr that have been determined in step 204 to step 206 are produced at the respective drive wheels of the vehicle 1 (step 108).

As described above, in the first exemplary embodiment, the drive forces for the left and right wheels are determined based on the total drive force for the drive wheels, the drive reaction forces at the drive wheels, and at least two of the target moment in the yaw direction of the vehicle, the target moment in the roll direction of the vehicle, and the target moment in the pitch direction of the vehicle. Then, the drive forces for the respective drive wheels are controlled to achieve at least two of the target yaw moment, the target roll moment, and the target pitch moment. As such, the performance desired by the driver can be obtained, and thus the drivability of the vehicle improves accordingly. In particular, in the case where the control is performed so as to achieve the target yaw moment and the target roll moment at the same time as in the first exemplary embodiment described above, the cornering performance desired by the driver can be obtained while suppressing the rolling of the vehicle. Here, it is to be noted that any apparatuses having the same structures as those employed in the first exemplary embodiment and its modification example provide advantages and effects that are the same as or similar to those obtained in the first exemplary embodiment and its modification example. Also, if appropriate, the structure of the first exemplary embodiment may be applied also in the form described below.

The second exemplary embodiment is the same as the first exemplary embodiment except that the pitch motion of the vehicle is controlled as well as the yaw motion and the roll motion. The principle of the vehicle dynamics control of the second exemplary embodiment is the same as that of the vehicle dynamics control of the first exemplary embodiment. Therefore, the vehicle dynamics control of the second exemplary embodiment will be described as control executed in the vehicle 1 having the vehicle drive apparatus 100 of the first exemplary embodiment. First, a description will be made of the method for determining the drive forces for the respective drive wheels in the vehicle dynamics control of the second exemplary embodiment.

In the vehicle dynamics control of the second exemplary embodiment, the yaw motion (motion around Z axis), the roll motion (motion around X axis), and the pitch motion (motion around Y axis) of the vehicle 1 are controlled by controlling the drive forces for the respective drive wheels of the vehicle 1. When the pitch inertia moment is denoted as "Ip", the target pitch rate is denoted as "P_ref", the front wheel load (load on the front-left wheel 2l and the front-right wheel 2r) is denoted as "Wf", the rear wheel load (load on the rear-left wheel 3l and the rear-right wheel 3r) is denoted as "Wr", the front wheel static load (static load on the front-left wheel 2l and the front-right wheel 2r) is denoted as "Wf0", the rear wheel static load (static load on the rear-left wheel 3l and the rear-right wheel 3r) is denoted as "Wr0", the equations of motion for the pitching of the vehicle can be described, for example, as the expression (22) to the expression (24). Note that the product of the pitch inertia moment Ip and the target pitch rate P_ref is a target pitch moment Myref.

In these equations, "Ffl" represents the drive reaction forces at the front wheels and is the sum of a front-left wheel drive reaction force Ffl×tan $\alpha_{fl}$ and a front-right wheel drive reaction force Ffr×tan $\alpha_{fr}$. Likewise "Frl" represents the drive reaction forces at the rear wheels and is the sum of a rear-left wheel drive reaction force Frl×tan $\alpha_{rl}$ and a rear-right wheel drive reaction force Frr×tan $\alpha_{rr}$. When the expressions (22) to (24) are reformulated into a single expression, the expression (27) is obtained. Note that "Ip×P_ref" of the left side of the expression (27) represents the target pitch moment Myref.

$$Myref = I_p P\_ref = WrLr - WfLf \quad \text{Expression (22)}$$

$$Wf = Wf0 - \frac{h}{L}F + Ffl \quad \text{Expression (23)}$$

$$Wr = Wr0 + \frac{h}{L}F - Frl \quad \text{Expression (24)}$$

$$Ffl = Ffl \tan \alpha_{fl} + Ffr \tan \alpha_{fr} \quad \text{Expression (25)}$$

$$Frl = Frl \tan \alpha_{rl} + Frr \tan \alpha_{rr} \quad \text{Expression (26)}$$

$$I_p \times P\_ref = (h - Lf \tan \alpha_{fl})Ffl + (h - Lf \tan \alpha_{fr})Ffr + (h - Lr \tan \alpha_{rl})Frl + (h - Lr \tan \alpha_{rr})Frr \quad \text{Expression (27)}$$

The simultaneous equations in the expression (28) are obtained from the target yaw moment Mzref that is required to control the drive forces for the respective drive wheels and the yaw motion of the vehicle, the target roll moment Mxref that is required to control the drive reaction forces at the respective drive wheels and the roll motion of the vehicle, the total drive force F, and the target pitch moment Myref that can be expressed as a relation between the drive reaction forces at the respective drive wheels. That is, solving the simultaneous equations in the expression (28) determines the drive forces Ffl, Ffr, Frl, and Frr for the respective wheel that are needed to achieve all of the target roll moment Mxref, the target pitch moment Myref, and the target roll moment Mxref.

$$\begin{cases} F = Ffl + Ffr + Frl + Frr \\ Mzref = \frac{Df}{2}(Ffr - Ffl) + \frac{Dr}{2}(Frr + Frl) \\ Mxref = \frac{Df}{2}(Ffr \tan\alpha_{fr} - Ffl \tan\alpha_{fl}) - \frac{Df}{2}(Frr \tan\alpha_{rr} - Frl \tan\alpha_{rl}) \\ Myref = (h - Lf \tan\alpha_{fl})Ffl + (h - Lf \tan\alpha_{fr})Ffr + \\ \quad (h - Lr \tan\alpha_{rl})Frl + (h - Lr \tan\alpha_{rr})Frr \end{cases} \quad \text{Expression (28)}$$

The expression (29) describes the equations of the expression (28) in a matrix. When the first matrix of the right side of the expression (29) is designated as "A", if rank (A)=4, the matrix A is regular and therefore the simultaneous equations in the expression (29) are solvable. In this case, the drive forces Ffl, Ffr, Frl, and Frr required to achieve the target yaw moment Mzref, the target roll moment Mxref and the target pitch moment Myref can be determined by multiplying each side of the expression (29) by $A^{-1}$, which is an inverse matrix of A, from the left side as shown in the expression (30). Next, the vehicle dynamics control of the second exemplary embodiment will be described. Note that the vehicle dynamics control of the second exemplary embodiment can be performed by the vehicle dynamics controller of the first exemplary embodiment (See FIG. 6). In the following description, therefore, refer also to FIG. 1 to FIG. 6 as needed.

$$\begin{bmatrix} F \\ Mzref \\ Mxref \\ Myref \end{bmatrix} = \underbrace{\begin{bmatrix} 1 & 1 & 1 & 1 \\ -\dfrac{Df}{2} & \dfrac{Df}{2} & -\dfrac{Dr}{2} & \dfrac{Dr}{2} \\ -\dfrac{Df}{2}\tan\alpha_{fl} & \dfrac{Df}{2}\tan\alpha_{fr} & \dfrac{Dr}{2}\tan\alpha_{rl} & -\dfrac{Dr}{2}\tan\alpha_{rr} \\ h - Lf\tan\alpha_{fl} & h - Lf\tan\alpha_{fr} & h - Lr\tan\alpha_{rl} & h - Lr\tan\alpha_{rr} \end{bmatrix}}_{A} \begin{bmatrix} Ffl \\ Ffr \\ Frl \\ Frr \end{bmatrix}$$

Expression (29)

$$\begin{bmatrix} Ffl \\ Ffr \\ Frl \\ Frr \end{bmatrix} = \begin{bmatrix} 1 & 1 & 1 & 1 \\ -\dfrac{Df}{2} & \dfrac{Df}{2} & -\dfrac{Dr}{2} & \dfrac{Dr}{2} \\ -\dfrac{Df}{2}\tan\alpha_{fl} & \dfrac{Df}{2}\tan\alpha_{fl} & \dfrac{Dr}{2}\tan\alpha_{rl} & -\dfrac{Dr}{2}\tan\alpha_{rr} \\ h - Lf\tan\alpha_{fl} & h - Lf\tan\alpha_{fr} & h - Lr\tan\alpha_{rl} & h - Lr\tan\alpha_{rr} \end{bmatrix}^{-1} \begin{bmatrix} F \\ Mzref \\ Mxref \\ Myref \end{bmatrix}$$

Expression (30)

Figure 10:
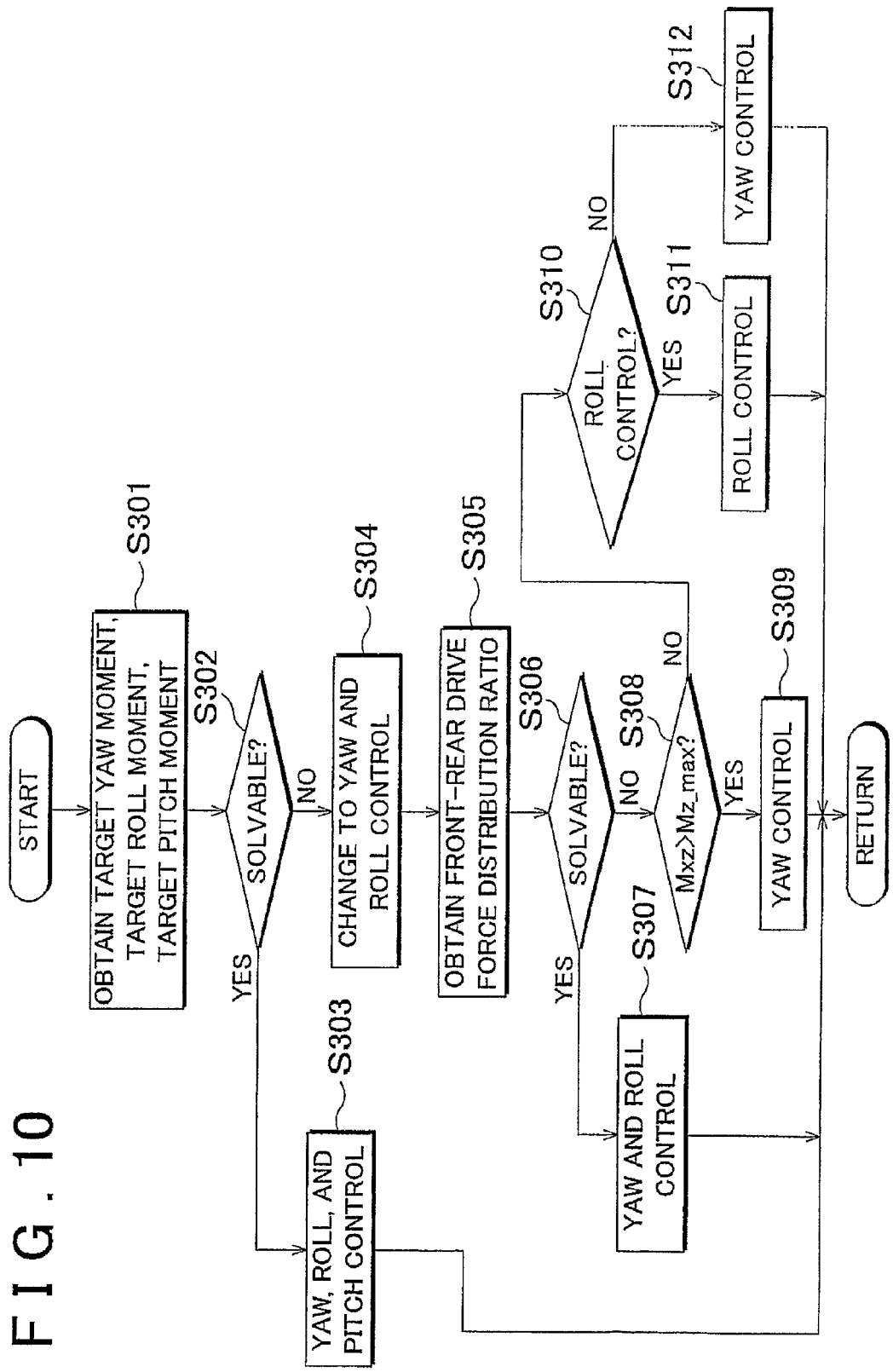
FIG. 10 is a flowchart showing a vehicle control procedure in the second exemplary embodiment.

FIG. 10 is a flowchart showing the vehicle control procedure in the second exemplary embodiment. When executing the vehicle dynamics control of the second exemplary embodiment, the vehicle dynamics controller 30 obtains the target yaw moment Mzref, the target roll moment Mxref, and the target pitch moment Myref (step 301). The target pitch moment Myref is obtained by multiplying the pitch inertia moment Ip and the target pitch rate P_ref as described above, and the target pitch rate P_ref is expressed as the expression (31). "P_ref_tmp" in the expression (31) is expressed as the expression (32). Note that the expression (31) is described in S domain. (S) attached to the target pitch rate P_ref of the left side indicates that the expression (31) is described in s-domain. Thus, the target pitch rate P_ref in time-domain can be obtained by converting the expression (31) to an expression in time-domain.

$$P\_ref(s) = \dfrac{1}{TS+1} \times P\_ref\_tmp(S)$$

Expression (31)

$$P\_ref\_tmp = Go \times \dfrac{d}{dt} DF\_ref$$

Expression (32)

In the above expressions, "Go" represents a pitch angle gain that has been empirically obtained, "DF_ref" represents the drive force required by the driver, and "S" is a Laplace operator. The expression (32), due to differential elements, provides a high gain of drive force in response to the accelerator pedal being stepped down sharply, and it causes large variations of the longitudinal acceleration, making it difficult to suppress the behavior of the vehicle 1 while maintaining a desired drivability. Thus, a first-order lag element is added as a pre-filter to the expression (32) to obtain the expression (31), and the target pitch rate P_ref is obtained by the expression (31) so that the dynamics control of the vehicle 1 can be suppressed while achieving a desired drivability.

The control determination portion 32 of the vehicle dynamics controller 30 determines whether the simultaneous equations of the expression (28) are solvable (step 302). That is, if rank (A)=4, the simultaneous equations of the expression (28) are solvable. If the simultaneous equations of the expression (28) are solvable (step 302: YES), the target yaw moment Mzref, the target roll moment Mxref, and the target pitch moment Myref can all be achieved.

In this case, the drive force calculation portion 31 obtains the total drive force F for the vehicle 1 and determines the drive forces Ffl, Ffr, Frl, and Frr for the respective drive wheels by applying the target yaw moment Mzref, the target roll moment Mxref, and the target pitch moment Myref, which have been obtained in step S301, and the total drive force F to the expression (30). Then, the drive force control portion 33 of the vehicle dynamics controller 30 drives the front-left electric motor 10*l*, the front-right electric motor 10*r*, the rear-left electric motor 11*l*, and the rear-right electric motor 11*r* so as to produce the determined drive forces Ffl, Ffr, Frl, and Frr at the respective drive wheels. As such, the yawing and rolling of the vehicle 1 are controlled simultaneously (step 303). Note that "control of pitching (pitching control)" represents controlling the drive forces for the respective drive wheels of the vehicle 1 to achieve the target pitch moment Myref.

On the other hand, if the simultaneous equations of the expression (28) are not solvable (step 302: NO), that is, if rank (A)≠4, it is impossible to achieve the target yaw moment Mzref, the target roll moment Mxref, and the target pitch moment Myref at the same time. In this case, the control is switched to achieve at least one of the target yaw moment Mzref, the target roll moment Mxref, and the target pitch moment Myref (step 304).

After the control has been switched to achieve at least one of the target yaw moment Mzref, the target roll moment Mxref, and the target pitch moment Myref (step 304), the drive force calculation portion 31 then determines the front-rear drive force distribution ratio i (step 305). Then, the control determination portion 32 of the vehicle dynamics controller 30 obtains the front-rear drive force distribution ratio i from the drive force calculation portion 31 (step 305) and applies it to the matrix A of the expression (29) to determine whether the simultaneous equations of the expression (28) are solvable (step 306). Note that the processes in steps 307 to 312 are the same as those in steps 103 to 108 and therefore their descriptions are omitted.

As described above, in the second exemplary embodiment, the drive forces for the left and right wheels are determined based on the total drive force for the drive wheels, the drive reaction forces at the drive wheels, and at least two of the target moment in the yaw direction of the vehicle, the target moment in the roll direction of the vehicle, and the target moment in the pitch direction of the vehicle, and the drive forces for the respective drive wheels are controlled so as to achieve at least two of the target yaw moment, the target roll moment, and the target pitch moment of the vehicle at the same time. As such, the performance desired by the driver can be achieved, and thus the drivability improves accordingly. Here, it is to be noted that any apparatuses having the same structures as those employed in the second exemplary embodiment provide advantages and effects that are the same as or similar to those obtained in the second exemplary embodiment.

As described above, the vehicle drive apparatuses according to the invention effectively improves the drivability of a vehicle having a powertrain that provides different drive forces at at least a pair of left and right drive wheels.

The invention claimed is:

1. A vehicle drive apparatus for a vehicle that can provide different drive forces at at least a pair of left and right drive wheels, respectively, comprising:
a controller configured to determine drive forces that drive the left and right drive wheels by simultaneously solving an expression including a relation between a target moment required in a yaw direction of the vehicle and the drive forces for the drive wheels, a relation between a target moment required in a roll direction of the vehicle and drive reaction forces at the drive wheels, a total drive force for the drive wheels which is the sum of drive forces that drive the left and right drive wheels, and a front-rear distribution ratio of the total drive force,
wherein the expression is simultaneously solved so the drive forces that drive the left and right drive wheels achieve both the target moment required in the yaw direction of the vehicle and the target moment required in the roll direction of the vehicle.

2. The vehicle drive apparatus according to claim 1, wherein the expression includes at least two of a relation between the target moment in the yaw direction of the vehicle and the difference between the drive force for the left drive wheel and the drive force for the right drive wheel, a relation between the target moment in the roll direction of the vehicle and the difference between the drive reaction force at the left drive wheel and the drive reaction force at the right drive wheel, and a relation between a target moment in a pitch direction of the vehicle and the drive reaction forces at the left and right drive wheels.

3. The vehicle drive apparatus according to claim 2, wherein the expression includes the target moment in the yaw direction of the vehicle, the target moment in the roll direction of the vehicle, and the target moment in the pitch direction of the vehicle.

4. The vehicle drive apparatus according to claim 3, wherein when the expression cannot be solved so the drive forces for the left and right drive wheels achieve the target moment in the yaw direction of the vehicle, the target moment in the roll direction of the vehicle, and the target moment in the pitch direction of the vehicle at the same time, then the controller achieves at least one of the target moment in the yaw direction of the vehicle and the target moment in the roll direction of the vehicle.

5. The vehicle drive apparatus according to claim 2, wherein the expression includes the target moment in the yaw direction of the vehicle and the target moment in the roll direction of the vehicle.

6. The vehicle drive apparatus according to claim 3, wherein when the expression cannot be solved so the drive forces for the left and right drive wheels achieve the target moment in the yaw direction of the vehicle and the target moment in the roll direction of the vehicle at the same time, if a yaw moment of the vehicle that is estimated to arise in response to the left and right drive wheels producing drive forces for controlling rolling of the vehicle is above a limit yaw moment of the vehicle, then the controller achieves the target moment in the yaw direction of the vehicle.

7. The vehicle drive apparatus according to claim 3, wherein when the expression cannot be solved so the drive forces for the left and right drive wheels achieve the target moment in the yaw direction of the vehicle and the target moment in the roll direction of the vehicle at the same time, then the controller achieves the target moment in the roll direction of the vehicle.

8. The vehicle drive apparatus according to claim 3, wherein when the expression cannot be solved so the drive forces for the left and right drive wheels achieve the target moment in the yaw direction of the vehicle and the target moment in the roll direction of the vehicle at the same time, then the controller achieves the target moment in the yaw direction of the vehicle.

9. The vehicle drive apparatus according to claim 3, wherein the controller determines whether to achieve the target moment in the yaw direction of the vehicle or the target moment in the roll direction of the vehicle based on a steering angle of a steerable wheel of the vehicle and a velocity of the steering angle.

10. The vehicle drive apparatus according to claim 9, wherein the controller determines to achieve the target moment in the roll direction if the steering angle is equal to or smaller than a predetermined threshold and the velocity of the steering angle is not 0.

11. The vehicle drive apparatus according to claim 10, wherein the controller determines to achieve the target moment in the yaw direction if the steering angle is larger than the predetermined threshold or if the velocity of the steering angle is 0.

12. The vehicle drive apparatus according to claim 1, wherein electric motors are provided at the drive wheels and produce the drive forces for the drive wheels.

13. The vehicle drive apparatus according to claim 1, wherein the expression includes the target moment in the yaw direction of the vehicle, the target moment in the roll direction of the vehicle, and a target moment in a pitch direction of the vehicle.

14. The vehicle drive apparatus according to claim 13, wherein when the expression cannot be solved so the drive forces for the left and right drive wheels achieve the target moment in the yaw direction of the vehicle, the target moment in the roll direction of the vehicle, and the target moment in the pitch direction of the vehicle at the same time, then the controller achieves at least one of the target moment in the yaw direction of the vehicle and the target moment in the roll direction of the vehicle.

15. The vehicle drive apparatus according to claim 13, wherein when the expression cannot be solved so the drive forces for the left and right drive wheels achieve the target moment in the yaw direction of the vehicle and the target moment in the roll direction of the vehicle at the same time, if a yaw moment of the vehicle that is estimated to arise in response to the left and right drive wheels producing drive forces for controlling rolling of the vehicle is above a limit yaw moment of the vehicle, then the controller achieves the target moment in the yaw direction of the vehicle.

16. The vehicle drive apparatus according to claim 13, wherein when the expression cannot be solved so the drive forces for the left and right drive wheels achieve the target moment in the yaw direction of the vehicle and the target moment in the roll direction of the vehicle at the same time, then the controller achieves the target moment in the roll direction of the vehicle.

17. The vehicle drive apparatus according to claim 13, wherein when the expression cannot be solved so the drive forces for the left and right drive wheels achieve the target moment in the yaw direction of the vehicle and the target moment in the roll direction of the vehicle at the same time, then the controller achieves the target moment in the yaw direction of the vehicle.

18. The vehicle drive apparatus according to claim 13, wherein the controller determines whether to achieve the target moment in the yaw direction of the vehicle or the target moment in the roll direction of the vehicle based on a steering angle of a steerable wheel of the vehicle and a velocity of the steering angle.

19. The vehicle drive apparatus according to claim 18, wherein the controller determines to achieve the target moment in the roll direction if the steering angle is equal to or smaller than a predetermined threshold and the velocity of the steering angle is not 0.

20. The vehicle drive apparatus according to claim 19, wherein the controller determines to achieve the target moment in the yaw direction if the steering angle is larger than the predetermined threshold or if the velocity of the steering angle is 0.

21. The vehicle drive apparatus according to claim 1, wherein the expression is a first expression and when the first expression cannot be solved so the drive forces for the left and right drive wheels achieve both the target moment in the yaw direction of the vehicle and the target moment required in the roll direction of the vehicle, the controller determines the drive forces for the left and right drive wheels achieve only one of the target moment required in the yaw direction of the vehicle and the target moment required in the roll direction of the vehicle, by solving a second expression.

* * * * *